US012682535B2

(12) United States Patent　　　　　(10) Patent No.:　US 12,682,535 B2
Ramani et al.　　　　　　　　　　　　(45) Date of Patent:　　　Jul. 14, 2026

(54) SYSTEM AND METHOD FOR AUTHORING CONTEXT-AWARE AUGMENTED REALITY INSTRUCTION THROUGH GENERATIVE ARTIFICIAL INTELLIGENCE

(71) Applicant: Purdue Research Foundation, West Lafayette, IN (US)

(72) Inventors: Karthik Ramani, West Lafayette, IN (US); Seunggeun Chi, West Lafayette, IN (US); Hyung-gun Chi, West Lafayette, IN (US); Rahul Jain, West Lafayette, IN (US); Jingyu Shi, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 19/026,990

(22) Filed: Jan. 17, 2025

(65) Prior Publication Data

US 2025/0238991 A1　　Jul. 24, 2025

Related U.S. Application Data

(60) Provisional application No. 63/622,351, filed on Jan. 18, 2024.

(51) Int. Cl.
　　*G06T 13/40*　　　(2011.01)
　　*G06F 3/01*　　　　(2006.01)
　　　　　　(Continued)

(52) U.S. Cl.
　　CPC .............. *G06T 13/40* (2013.01); *G06F 3/012* (2013.01); *G06T 7/70* (2017.01); *G06T 19/006* (2013.01);
　　　　　　(Continued)

(58) Field of Classification Search
　　CPC ......... G06T 13/40; G06T 7/70; G06T 19/006; G06F 3/012; G06F 40/284; G06V 20/20; G09B 5/02
　　See application file for complete search history.

(56) References Cited

U.S. PATENT DOCUMENTS 11,200,892　B1 *　12/2021　Stoops .................... G06F 3/167
11,232,645　B1 *　1/2022　Roche .................... G06V 20/20
　　　　　　(Continued)

OTHER PUBLICATIONS

Seeliger, A., Weibel, R. P., & Feuerriegel, S. (2024). Context-adaptive visual cues for safe navigation in augmented reality using machine learning. International Journal of Human-Computer Interaction, 40(3), 761-781.

(Continued)

*Primary Examiner* — Md Saiful A Siddiqui

(74) *Attorney, Agent, or Firm* — Maginot, Moore & Beck LLP

(57)　　　　　ABSTRACT

A method for generating augmented reality (AR) instructional content is disclosed. The method advantageously provides an AR graphical user interface for generating AR instructional content for performing a task from user-input text descriptions of the task. The method advantageously leverages generative artificial intelligence to enable a code-free and motion-capture-free experience for authoring the AR instructional content, including virtual avatar animations demonstrating performance of the steps of the task. Additionally, the method advantageously overcomes the contextual barrier by enabling the user to author context-aware AR instructions that understand the context and blend physical reality with virtual components.

19 Claims, 14 Drawing Sheets

(51) Int. Cl.

| | |
|---|---|
| *G06F 40/284* | (2020.01) |
| *G06T 7/70* | (2017.01) |
| *G06T 19/00* | (2011.01) |
| *G06V 20/20* | (2022.01) |
| *G09B 5/02* | (2006.01) |

(52) U.S. Cl.
CPC ............... *G06V 20/20* (2022.01); *G09B 5/02* (2013.01); *G06F 40/284* (2020.01)

(56) References Cited

U.S. PATENT DOCUMENTS

| | | | | |
|---|---|---|---|---|
| 11,861,778 | B1* | 1/2024 | Donnell ................. | H04L 51/10 |
| 2022/0076473 | A1* | 3/2022 | Jeon ...................... | G06T 19/006 |
| 2023/0410398 | A1* | 12/2023 | Song ....................... | G06T 7/246 |
| 2024/0257470 | A1* | 8/2024 | Gupta ..................... | G06T 19/00 |
| 2024/0338872 | A1* | 10/2024 | Giovara ................ | G06T 15/005 |
| 2025/0078377 | A1* | 3/2025 | Kapadia ................... | G06T 7/80 |
| 2025/0200091 | A1* | 6/2025 | Ali .......................... | G06F 40/40 |
| 2025/0200855 | A1* | 6/2025 | Park ...................... | G06T 13/205 |
| 2025/0225709 | A1* | 7/2025 | Zhang ..................... | G06T 13/40 |

OTHER PUBLICATIONS

Soberl, D. (2023). Mixed reality and deep learning: Augmenting visual information using generative adversarial networks. In Augmented Reality and Artificial Intelligence: The Fusion of Advanced Technologies (pp. 3-29). Cham: Springer Nature Switzerland.

Sohl-Dickstein, J., Weiss, E., Maheswaranathan, N., & Ganguli, S. (Jun. 2015). Deep unsupervised learning using nonequilibrium thermodynamics. In International conference on machine learning (pp. 2256-2265). PMLR.

Soliman, M., & Al Balushi, M. K. (2023). Unveiling destination evangelism through generative AI tools. Robonomics: The Journal of the Automated Economy, 4, 54.

Tang, K., Niu, Y., Huang, J., Shi, J., & Zhang, H. (2020). Unbiased scene graph generation from biased training. In Proceedings of the IEEE/CVF conference on computer vision and pattern recognition (pp. 3716-3725).

Unity Technologies. 2023. Unity3D. Retrieved Dec. 9, 2023 from https://unity.com/.

Zhang, M., Cai, Z., Pan, L., Hong, F., Guo, X., Yang, L., & Liu, Z. (2022). Motiondiffuse: Text-driven human motion generation with diffusion model. arXiv preprint arXiv:2208.15001.

Uriarte-Portillo, A., Ibáñez, M. B., Zatarain-Cabada, R., & Barrón-Estrada, M. L. (2023). Comparison of using an augmented reality learning tool at home and in a classroom regarding motivation and learning outcomes. Multimodal Technologies and Interaction, 7(3), 23.

Wang, T. (2022). Supporting the Design and Authoring of Pervasive Smart Environments (Doctoral dissertation, Purdue University).

Wang, T., Qian, X., He, F., Hu, X., Huo, K., Cao, Y., & Ramani, K. (Oct. 2020). CAPturAR: An augmented reality tool for authoring human-involved context-aware applications. In Proceedings of the 33rd Annual ACM Symposium on User Interface Software and Technology (pp. 328-341).

Wang, X., Wang, Y., Shi, Y., Zhang, W., & Zheng, Q. (Oct. 2020). Avatarmeeting: An augmented reality remote interaction system with personalized avatars. In Proceedings of the 28th ACM International Conference on Multimedia (pp. 4533-4535).

Wang, X., Yew, A. W. W., Ong, S. K., & Nee, A. Y. (2020). Enhancing smart shop floor management with ubiquitous augmented reality. International Journal of Production Research, 58(8), 2352-2367.

Wang, Z., Nguyen, C., Asente, P., & Dorsey, J. (May 2021). Distanciar: Authoring site-specific augmented reality experiences for remote environments. In Proceedings of the 2021 CHI Conference on Human Factors in Computing Systems (pp. 1-12).

Weerasinghe, M., Quigley, A., Pucihar, K. Č., Toniolo, A., Miguel, A., & Kljun, M. (2022). Arigato: Effects of Adaptive Guidance on Engagement and Performance in Augmented Reality Learning Environments. IEEE Transactions on Visualization and Computer Graphics, 28(11), 3737-3747.

Weidner, F., Boettcher, G., Arboleda, S. A., Diao, C., Sinani, L., Kunert, C., . . . & Raake, A. (2023). A systematic review on the visualization of avatars and agents in ar & vr displayed using head-mounted displays. IEEE Transactions on Visualization and Computer Graphics, 29(5), 2596-2606.

White, J., Fu, Q., Hays, S., Sandborn, M., Olea, C., Gilbert, H., & Schmidt, D. C. (2023). A prompt pattern catalog to enhance prompt engineering with chatgpt. arXiv preprint arXiv:2302.11382.

Xu, D., Zhu, Y., Choy, C. B., & Fei-Fei, L. (2017). Scene graph generation by iterative message passing. In Proceedings of the IEEE conference on computer vision and pattern recognition (pp. 5410-5419).

Ye, H., & Fu, H. (Apr. 2022). ProGesAR: Mobile AR Prototyping for Proxemic and Gestural Interactions with Real-world IoT Enhanced Spaces. In Proceedings of the 2022 CHI Conference on Human Factors in Computing Systems (pp. 1-14).

Ye, H., Leng, J., Xiao, C., Wang, L., & Fu, H. (Apr. 2023). Proobjar: Prototyping spatially-aware interactions of smart objects with ar-hmd. In Proceedings of the 2023 CHI Conference on Human Factors in Computing Systems (pp. 1-15).

Yigitbas, E., Heindörfer, J., & Engels, G. (2019). A context-aware virtual reality first aid training application. In Proceedings of Mensch und Computer 2019 (pp. 885-888).

Yin, X., Fan, X., Zhu, W., & Liu, R. (2019). Synchronous AR assembly assistance and monitoring system based on ego-centric vision. Assembly Automation, 39(1), 1-16.

Yuan, Y., Chen, X., & Wang, J. (2020). Object-contextual representations for semantic segmentation. In Computer Vision—ECCV 2020: 16th European Conference, Glasgow, UK, Aug. 23-28, 2020, Proceedings, Part VI 16 (pp. 173-190). Springer International Publishing.

Yun, K., Lu, T., & Chow, E. (Apr. 2018). Occluded object reconstruction for first responders with augmented reality glasses using conditional generative adversarial networks. In Pattern Recognition and Tracking XXIX (vol. 10649, pp. 225-231). SPIE.

Zhao, Z., & Ma, X. (Dec. 2018). A compensation method of two-stage image generation for human-ai collaborated in-situ fashion design in augmented reality environment. In 2018 IEEE International Conference on Artificial Intelligence and Virtual Reality (AIVR) (pp. 76-83). IEEE.

Zheng, J., Zheng, Q., Fang, L., Liu, Y., & Yi, L. (2023). Cams: Canonicalized manipulation spaces for category-level functional hand-object manipulation synthesis. In Proceedings of the IEEE/CVF Conference on Computer Vision and Pattern Recognition (pp. 585-594).

Zhu, Z., Liu, Z., Zhang, Y., Zhu, L., Huang, J., Villanueva, A. M., & Ramani, K. (Apr. 2023). Learniotvr: An end-to-end virtual reality environment providing authentic learning experiences for internet of things. In Proceedings of the 2023 CHI Conference on Human Factors in Computing Systems (pp. 1-17).

Keskar, N. S., McCann, B., Varshney, L. R., Xiong, C., & Socher, R. (2019). Ctrl: A conditional transformer language model for controllable generation. arXiv preprint arXiv:1909.05858.

Kim, D. Y., Lee, H. K., & Chung, K. (2023). Avatar-mediated experience in the metaverse: The impact of avatar realism on user-avatar relationship. Journal of Retailing and Consumer Services, 73, 103382.

Kim, M., Lee, K., Balan, R., & Lee, Y. (Apr. 2023). Bubbleu: Exploring Augmented Reality Game Design with Uncertain AI-based Interaction. In Proceedings of the 2023 CHI Conference on Human Factors in Computing Systems (pp. 1-18).

Kim, S., Chi, H. G., & Ramani, K. (2021). Object synthesis by learning part geometry with surface and volumetric representations. Computer-Aided Design, 130, 102932.

Krings, S., Yigitbas, E., Jovanovikj, I., Sauer, S., & Engels, G. (Jun. 2020). Development framework for context-aware augmented reality applications. In Companion Proceedings of the 12th ACM SIGCHI Symposium on Engineering Interactive Computing Systems (pp. 1-6).

(56) References Cited

OTHER PUBLICATIONS

Labbe, Y., Manuelli, L., Mousavian, A., Tyree, S., Birchfield, S., Tremblay, J., & Sivic, J. (2022). Megapose: 6d pose estimation of novel objects via render & compare. arXiv preprint arXiv:2212.06870.

Lacoche, J., & Villain, E. (Feb. 2022). Prototyping context-aware augmented reality applications for smart environments inside virtual reality. In GRAPP 2022.

Lavric, T. (2022). Methodologies and tools for expert knowledge sharing in manual assembly industries by using augmented reality (Doctoral dissertation, Institut Polytechnique de Paris).

Lee, B., Sedlmair, M., & Schmalstieg, D. (2023). Design patterns for situated visualization in augmented reality. IEEE Transactions on Visualization and Computer Graphics.

Lee, G. A., Kim, G. J., & Billinghurst, M. (2005). Immersive authoring: What you experience is what you get (wyxiwyg). Communications of the ACM, 48(7), 76-81.

Lee, J., & Lan, A. (Jun. 2023). Smartphone: Exploring keyword mnemonic with auto-generated verbal and visual cues. In International Conference on Artificial Intelligence in Education (pp. 16-27). Cham: Springer Nature Switzerland.

Li, W., Li, C., Kim, M., Huang, H., & Yu, L. F. (Apr. 2023). Location-aware adaptation of augmented reality narratives. In Proceedings of the 2023 CHI Conference on Human Factors in Computing Systems (pp. 1-15).

Li, Y. L., Zhou, S., Huang, X., Xu, L., Ma, Z., Fang, H. S., & Lu, C. (2019). Transferable interactiveness knowledge for human-object interaction detection. In Proceedings of the IEEE/CVF Conference on Computer Vision and Pattern Recognition (pp. 3585-3594).

Liu, D., Long, C., Zhang, H., Yu, H., Dong, X., & Xiao, C. (2020). Arshadowgan: Shadow generative adversarial network for augmented reality in single light scenes. In Proceedings of the IEEE/CVF conference on computer vision and pattern recognition (pp. 8139-8148).

Liu, J. S., Tversky, B., & Feiner, S. (2022). Precueing object placement and orientation for manual tasks in augmented reality. IEEE Transactions on Visualization and Computer Graphics, 28(11), 3799-3809.

Liu, S., Toreini, P., & Maedche, A. (2022). Designing Gaze-Aware Attention Feedback for Learning in Mixed Reality. In Proceedings of Mensch und Computer 2022 (pp. 503-508).

Liu, V., Vermeulen, J., Fitzmaurice, G., & Matejka, J. (Jul. 2023). 3DALL-E: Integrating text-to-image AI in 3D design workflows. In Proceedings of the 2023 ACM designing interactive systems conference (pp. 1955-1977).

Liu, Z., Zhu, Z., Jiang, E., Huang, F., Villanueva, A. M., Qian, X., & Ramani, K. (Apr. 2023). Instrumentar: Auto-generation of augmented reality tutorials for operating digital instruments through recording embodied demonstration. In Proceedings of the 2023 CHI Conference on Human Factors in Computing Systems (pp. 1-17).

Louie, R., Coenen, A., Huang, C. Z., Terry, M., & Cai, C. J. (Apr. 2020). Novice-AI music co-creation via AI-steering tools for deep generative models. In Proceedings of the 2020 CHI conference on human factors in computing systems (pp. 1-13).

Luo, Y., Liu, F., She, Y., & Yang, B. (2023). A context-aware mobile augmented reality pet interaction model to enhance user experience. Computer Animation and Virtual Worlds, 34(1), e2123.

Lv, Z. (2023). Generative artificial intelligence in the metaverse era. Cognitive Robotics, 3, 208-217.

Maio, R., Santos, A., Marques, B., Ferreira, C., Almeida, D., Ramalho, P., & Santos, B. S. (2023). Pervasive Augmented Reality to support logistics operators in industrial scenarios: a shop floor user study on kit assembly. The International Journal of Advanced Manufacturing Technology, 127(3), 1631-1649.

Microsoft. 2021. HoloLens2. https://www.microsoft.com/en-us/hololens/hardware. Accessed on Sep. 12, 2023.

Monteiro, K., Vatsal, R., Chulpongsatorn, N., Parnami, A., & Suzuki, R. (Apr. 2023). Teachable reality: Prototyping tangible augmented reality with everyday objects by leveraging interactive machine teaching. In Proceedings of the 2023 CHI Conference on Human Factors in Computing Systems (pp. 1-15).

Morris, A., Guan, J., Lessio, N., & Shao, Y. (Oct. 2020). Toward mixed reality hybrid objects with iot avatar agents. In 2020 IEEE International Conference on Systems, Man, and Cybernetics (SMC) (pp. 766-773). IEEE.

Muff, F., & Fill, H. G. (2022). A Framework for Context-Dependent Augmented Reality Applications Using Machine Learning and Ontological Reasoning. In AAAI Spring Symposium: MAKE.

Nebeling, M., Lewis, K., Chang, Y. C., Zhu, L., Chung, M., Wang, P., & Nebeling, J. (Apr. 2020). XRDirector: A role-based collaborative immersive authoring system. In Proceedings of the 2020 CHI Conference on Human Factors in Computing Systems (pp. 1-12).

Nichol, A., Dhariwal, P., Ramesh, A., Shyam, P., Mishkin, P., McGrew, B., & Chen, M. (2021). Glide: Towards photorealistic image generation and editing with text-guided diffusion models. arXiv preprint arXiv:2112.10741.

OpenAI. 2021. ChatGPT: A large-scale generative language model. https://www.openai.com/research/chatgpt. Accessed on Sep. 12, 2023.

Pan, X., Zheng, M., Xu, X., & Campbell, A. G. (2021). Knowing your student: Targeted teaching decision support through asymmetric mixed reality collaborative learning. IEEE Access, 9, 164742-164751.

Preda, M., & Lavric, T. (2023). Augmented Reality Training in Manufacturing Sectors. In The Digital Twin (pp. 447-496). Cham: Springer International Publishing.

Qian, X. (2023). Explore the Design and Authoring of Ai-driven Context-aware Augmented Reality Experiences (Doctoral dissertation, Purdue University).

Qian, X., He, F., Hu, X., Wang, T., Ipsita, A., & Ramani, K. (Apr. 2022). Scalar: Authoring semantically adaptive augmented reality experiences in virtual reality. In Proceedings of the 2022 CHI Conference on Human Factors in Computing Systems (pp. 1-18).

Radford, A., Kim, J. W., Hallacy, C., Ramesh, A., Goh, G., Agarwal, S., . . . & Sutskever, I. (Jul. 2021). Learning transferable visual models from natural language supervision. In International conference on machine learning (pp. 8748-8763). PMLR.

Radford, A. (2018). Improving language understanding by generative pre-training.

Radford, A., Wu, J., Child, R., Luan, D., Amodei, D., & Sutskever, I. (2019). Language models are unsupervised multitask learners. OpenAI blog, 1(8), 9.

Raffel, C., Shazeer, N., Roberts, A., Lee, K., Narang, S., Matena, M., . . . & Liu, P. J. (2020). Exploring the limits of transfer learning with a unified text-to-text transformer. Journal of machine learning research, 21(140), 1-67.

Ramesh, A., Dhariwal, P., Nichol, A., Chu, C., & Chen, M. (2022). Hierarchical text-conditional image generation with clip latents. arXiv preprint arXiv:2204.06125, 1(2), 3.

Ramesh, A., Pavlov, M., Goh, G., Gray, S., Voss, C., Radford, A., & Sutskever, I. (Jul. 2021). Zero-shot text-to-image generation. In International conference on machine learning (pp. 8821-8831). Pmlr.

Reddy, V. S. S. S. (2022). An Exploration of the Virtual Digital Twin Capture for Spatial Tasks and its Applications (Master's thesis, Purdue University).

Redmon, J. (2016). You only look once: Unified, real-time object detection. In Proceedings of the IEEE conference on computer vision and pattern recognition.

Robin Rombach, Andreas Blattmann, Dominik Lorenz, Patrick Esser, and Bjorn Ommer. 2021. High-Resolution Image Synthesis with Latent Diffusion Models. arXiv:2112.10752[cs.CV].

Robin Rombach, Andreas Blattmann, Dominik Lorenz, Patrick Esser, and Bjorn Ommer. 2022. High-Resolution Image Synthesis With Latent Diffusion Models. In Proceedings of the IEEE/CVF Conference on Computer Vision and Pattern Recognition (CVPR). 10684-10695.

Zhao Ruizhi. 2021. Context-Aware AR Scheduling Assistant Using Personalized Avatars. (2021).

Sachan, M. S., & Peiris, R. L. (Apr. 2022). Designing augmented reality based interventions to encourage physical activity during

(56) References Cited

OTHER PUBLICATIONS virtual classes. In CHI Conference on Human Factors in Computing Systems Extended Abstracts (pp. 1-6).

Chitwan Saharia, William Chan, Saurabh Saxena, Lala Li, Jay Whang, Emily Denton, Seyed Kamyar Seyed Ghasemipour, Burcu Karagol Ayan, S. Sara Mahdavi, Rapha Gontijo Lopes, Tim Salimans, Jonathan Ho, David J Fleet, and Mohammad Norouzi. 2022. Photo realistic Text-to-Image Diffusion Models with Deep Language Understanding. arXiv:2205.11487 [cs.CV].

Chitwan Saharia, William Chan, Saurabh Saxena, Lala Li, Jay Whang, Emily L Denton, Kamyar Ghasemipour, Raphael Gontijo Lopes, Burcu Karagol Ayan, Tim Salimans, Jonathan Ho, David J Fleet, and Mohammad Norouzi. 2022. Photorealistic Text-to-Image Diffusion Models with Deep Language Understanding. In Advances in Neural Information Processing Systems, S. Koyejo, S. Mohamed, A. Agarwal, D. Belgrave, K. Cho, and A. Oh (Eds.), vol. 35. Curran Associates, Inc., 36479-36494.

Sandamini, A., Jayathilaka, C., Pannala, T., Karunanayaka, K., Kumarasinghe, P., & Perera, D. (Nov. 2022). An Augmented Reality-based Fashion Design Interface with Artistic Contents Generated Using Deep Generative Models. In 2022 22nd International Conference on Advances in ICT for Emerging Regions (ICTer) (pp. 104-109). IEEE.

Scargill, T. (Oct. 2021). Context-Aware Markerless Augmented Reality for Shared Educational Spaces. In 2021 IEEE International Symposium on Mixed and Augmented Reality Adjunct (ISMAR-Adjunct) (pp. 469-472). IEEE.

Scargill, T., Chen, Y., Eom, S., Dunn, J., & Gorlatova, M. (Mar. 2022). Environmental, user, and social context-aware augmented reality for supporting personal development and change. In 2022 IEEE conference on virtual reality and 3D user interfaces abstracts and workshops (VRW) (pp. 155-162). IEEE.

2023.Midjourney. https://www.midjourney.com/Accessed:Aug. 2, 2023.

Alblehai, F. M. (2022). Individual experience and engagement in avatar-Mediated environments: the Mediating effect of interpersonal attraction. Journal of Educational Computing Research, 60(4), 986-1007.

Athanasiou, N., Petrovich, M., Black, M. J., & Varol, G. (Sep. 2022). Teach: Temporal action composition for 3d humans. In 2022 International Conference on 3D Vision (3DV) (pp. 414-423). IEEE.

Daniel Black. 2017. Why can I see my avatar? Embodied visual engagement in the third-person videogame. Games and Culture 12, 2 (2017), 179-199.

Bowman, D. A., Gabbard, J., Auerbach, D., Roofigari-Esfahan, N., Britt, K., Ilo, C. I., & Adapa, K. (Mar. 2022). Buildar: a proof-of-concept prototype of intelligent augmented reality in construction. In 2022 IEEE Conference on Virtual Reality and 3D User Interfaces Abstracts and Workshops (VRW) (pp. 508-512). IEEE.

Brown, T., Mann, B., Ryder, N., Subbiah, M., Kaplan, J. D., Dhariwal, P., . . . & Amodei, D. (2020). Language models are few-shot learners. Advances in neural information processing systems, 33, 1877-1901.

Cai, Q., Pan, Y., Ngo, C. W., Tian, X., Duan, L., & Yao, T. (2019). Exploring object relation in mean teacher for cross-domain detection. In Proceedings of the IEEE/CVF Conference on Computer Vision and Pattern Recognition (pp. 11457-11466).

Cao, J., Liu, X., Su, X., Tarkoma, S., & Hui, P. (Dec. 2021). Context-aware augmented reality with 5G edge. In 2021 IEEE Global Communications Conference (GLOBECOM) (pp. 1-6). IEEE.

Cao, Y., Fuste, A., & Heun, V. (Apr. 2022). Mobiletutar: A lightweight augmented reality tutorial system using spatially situated human segmentation videos. In CHI Conference on Human Factors in Computing Systems Extended Abstracts (pp. 1-8).

Cao, Y., Li, S., Liu, Y., Yan, Z., Dai, Y., Yu, P. S., & Sun, L. (2023). A comprehensive survey of ai-generated content (aigc): A history of generative ai from gan to chatgpt. arXiv preprint arXiv:2303.04226.

Cao, Y., Qian, X., Wang, T., Lee, R., Huo, K., & Ramani, K. (Apr. 2020). An exploratory study of augmented reality presence for tutoring machine tasks. In Proceedings of the 2020 CHI conference on human factors in computing systems (pp. 1-13).

Cao, Y., Wang, T., Qian, X., Rao, P. S., Wadhawan, M., Huo, K., & Ramani, K. (Oct. 2019). GhostAR: A time-space editor for embodied authoring of human-robot collaborative task with augmented reality. In Proceedings of the 32nd Annual ACM Symposium on User Interface Software and Technology (pp. 521-534).

Chamola, V., Bansal, G., Das, T. K., Hassija, V., Sai, S., Wang, J., & Niyato, D. (2024). Beyond reality: The pivotal role of generative ai in the metaverse. IEEE Internet of Things Magazine, 7(4), 126-135.

Chen, C., Nguyen, C., Hoffswell, J., Healey, J., Bui, T., & Weibel, N. (Oct. 2023). PaperToPlace: Transforming Instruction Documents into Spatialized and Context-Aware Mixed Reality Experiences. In Proceedings of the 36th Annual ACM Symposium on User Interface Software and Technology (pp. 1-21).

Chen, L., Tang, W., John, N., Wan, T. R., & Zhang, J. J. (2018). Context-aware mixed reality: A framework for ubiquitous interaction. arXiv preprint arXiv:1803.05541.

Chen, L., Tang, W., John, N. W., Wan, T. R., & Zhang, J. J. (Feb. 2020). Context-Aware Mixed Reality: A Learning-Based Framework for Semantic-Level Interaction. In Computer Graphics Forum (vol. 39, No. 1, pp. 484-496).

Chi, H. G., Chi, S., Chan, S., & Ramani, K. (May 2023). Pose Relation Transformer Refine Occlusions for Human Pose Estimation. In 2023 IEEE International Conference on Robotics and Automation (ICRA) (pp. 6138-6145). IEEE.

Chidambaram, S., Huang, H., He, F., Qian, X., Villanueva, A. M., Redick, T. S., & Ramani, K. (Jun. 2021). Processar: An augmented reality-based tool to create in-situ procedural 2d/3d ar instructions. In Proceedings of the 2021 ACM Designing Interactive Systems Conference (pp. 234-249).

Chidambaram, S., Reddy, S. S., Rumple, M., Ipsita, A., Villanueva, A., Redick, T., & Ramani, K. (Oct. 2022). EditAR: A Digital Twin Authoring Environment for Creation of AR/VR and Video Instructions from a Single Demonstration. In 2022 IEEE International Symposium on Mixed and Augmented Reality (ISMAR) (pp. 326-335). IEEE.

Christopoulos, A., Pellas, N., Kurczaba, J., & Macredie, R. (2022). The effects of augmented reality-supported instruction in tertiary-level medical education. British Journal of Educational Technology, 53(2), 307-325.

Davari, S., Lu, F., & Bowman, D. A. (Mar. 2022). Validating the benefits of glanceable and context-aware augmented reality for everyday information access tasks. In 2022 IEEE Conference on Virtual Reality and 3D User Interfaces (VR) (pp. 436-444). IEEE.

Deng, J., Dong, W., Socher, R., Li, L. J., Li, K., & Fei-Fei, L. (Jun. 2009). Imagenet: A large-scale hierarchical image database. In 2009 IEEE conference on computer vision and pattern recognition (pp. 248-255). IEEE.

Devlin, J. (2018). Bert: Pre-training of deep bidirectional transformers for language understanding. arXiv preprint arXiv:1810. 04805.

Dhariwal, P., & Nichol, A. (2021). Diffusion models beat gans on image synthesis. Advances in neural information processing systems, 34, 8780-8794.

Doughty, M., Singh, K., & Ghugre, N. R. (2021). SurgeonAssist-Net: towards context-aware head-mounted display-based augmented reality for surgical guidance. In Medical Image Computing and Computer Assisted Intervention—MICCAI 2021: 24th International Conference, Strasbourg, France, Sep. 27-Oct. 1, 2021, Proceedings, Part IV 24 (pp. 667-677). Springer International Publishing.

Fan, Q., Zhuo, W., Tang, C. K., & Tai, Y. W. (2020). Few-shot object detection with attention-RPN and multi-relation detector. In Proceedings of the IEEE/CVF conference on computer vision and pattern recognition (pp. 4013-4022).

Fan, Z., Taheri, O., Tzionas, D., Kocabas, M., Kaufmann, M., Black, M. J., & Hilliges, O. (2023). ARCTIC: A dataset for dexterous bimanual hand-object manipulation. In Proceedings of the IEEE/CVF Conference on Computer Vision and Pattern Recognition (pp. 12943-12954).

(56) References Cited

OTHER PUBLICATIONS

Fei, J., Xia, Z., Yu, P., & Xiao, F. (2021). Exposing AI-generated videos with motion magnification. Multimedia Tools and Applications, 80(20), 30789-30802.

Blender Foundation. 2023. Blender-Open Source 3D Creation Software. Retrieved Dec. 9, 2023 from https://www.blender.org/.

Frizziero, L., Leon-Cardenas, C., Freddi, M., Grassoni, A., & Liverani, A. (2023). Augmented reality applied to design for disassembly assessment for a volumetric pump with rotating cylinder. Production & Manufacturing Research, 11(1), 2199815.

Gallardo, A. G., Estrada, M. L. B., Cabada, R. Z., Dalle, M. Z. G., & Portillo, A. U. (Aug. 2022). EstelAR: an Augmented Reality Astronomy learning tool for STEM students. In 2022 IEEE Mexican International Conference on Computer Science (ENC) (pp. 1-8). IEEE.

Epic Games. 2023. Unreal Engine. Retrieved Dec. 9, 2023 from https://www.unrealengine.com/.

Gattullo, M., Evangelista, A., Manghisi, V. M., Uva, A. E., Fiorentino, M., Boccaccio, A., . . . & Gabbard, J. L. (2020). Towards next generation technical documentation in augmented reality using a context-aware information manager. Applied sciences, 10(3), 780.

Gozalo-Brizuela, R., & Garrido-Merchan, E. C. (2023). ChatGPT is not all you need. A State of the Art Review of large Generative AI models. arXiv. arXiv preprint arXiv:2301.04655.

Grubert, J., Langlotz, T., Zollmann, S., & Regenbrecht, H. (2016). Towards pervasive augmented reality.

Guo, C., Zou, S., Zuo, X., Wang, S., Ji, W., Li, X., & Cheng, L. (2022). Generating diverse and natural 3d human motions from text. In Proceedings of the IEEE/CVF Conference on Computer Vision and Pattern Recognition (pp. 5152-5161).

Gutierrez, F., Verbert, K., & Htun, N. N. (Sep. 2018). PHARA: an augmented reality grocery store assistant. In Proceedings of the 20th International Conference on Human-Computer Interaction with Mobile Devices and Services Adjunct (pp. 339-345).

Herskovitz, J., Cheng, Y. F., Guo, A., Sample, A. P., & Nebeling, M. (2022). Xspace: An augmented reality toolkit for enabling spatially-aware distributed collaboration. Proceedings of the ACM on Human-Computer Interaction, 6(ISS), 277-302.

Ho, J., Jain, A., & Abbeel, P. (2020). Denoising diffusion probabilistic models. Advances in neural information processing systems, 33, 6840-6851.

Hoover, M., Miller, J., Gilbert, S., & Winer, E. (2020). Measuring the performance impact of using the microsoft hololens 1 to provide guided assembly work instructions. Journal of Computing and Information Science in Engineering, 20(6), 061001.

Hu, Y., Yuan, M., Xian, K., Samitha Elvitigala, D., & Quigley, A. (2023). Exploring the design space of employing ai-generated content for augmented reality display. arXiv e-prints, arXiv-2303.

Huang, G., Qian, X., Wang, T., Patel, F., Sreeram, M., Cao, Y., & Quinn, A. J. (May 2021). Adaptutar: An adaptive tutoring system for machine tasks in augmented reality. In Proceedings of the 2021 CHI Conference on Human Factors in Computing Systems (pp. 1-15).

Huang, Q., Park, J. S., Gupta, A., Bennett, P., Gong, R., Som, S., & Gao, J. (2023). Ark: Augmented reality with knowledge interactive emergent ability. arXiv preprint arXiv:2305.00970.

Jeong, H., & Kim, G. J. (Mar. 2023). Table2table: Merging "similar" workspaces and supporting adaptive telepresence demonstration guidance. In 2023 IEEE Conference on Virtual Reality and 3D User Interfaces Abstracts and Workshops (VRW) (pp. 402-406). IEEE.

Jo, D., Kim, K. H., & Kim, G. J. (2015). SpaceTime: adaptive control of the teleported avatar for improved AR tele-conference experience. Computer Animation and Virtual Worlds, 26(3-4), 259-269.

Johnson, J., Gupta, A., & Fei-Fei, L. (2018). Image generation from scene graphs. In Proceedings of the IEEE conference on computer vision and pattern recognition (pp. 1219-1228).

Justus, D., Brennan, J., Bonner, S., & McGough, A. S. (Dec. 2018). Predicting the computational cost of deep learning models. In 2018 IEEE international conference on big data (Big Data) (pp. 3873-3882). IEEE.

Kalamkar, D., Mudigere, D., Mellempudi, N., Das, D., Banerjee, K., Avancha, S., . . . & Dubey, P. (2019). A study of BFLOAT16 for deep learning training. arXiv preprint arXiv:1905.12322.

Kang, C., Yeom, I., Ashtari, A., Woo, W., & Noh, J. (2023). ARbility: re-inviting older wheelchair users to in-store shopping via wearable augmented reality. Virtual Reality, 27(3), 1919-1936.

Karunratanakul, K., Preechakul, K., Suwajanakorn, S., & Tang, S. (2023). Gmd: Controllable human motion synthesis via guided diffusion models. arXiv preprint arXiv:2305.12577, 3.

* cited by examiner

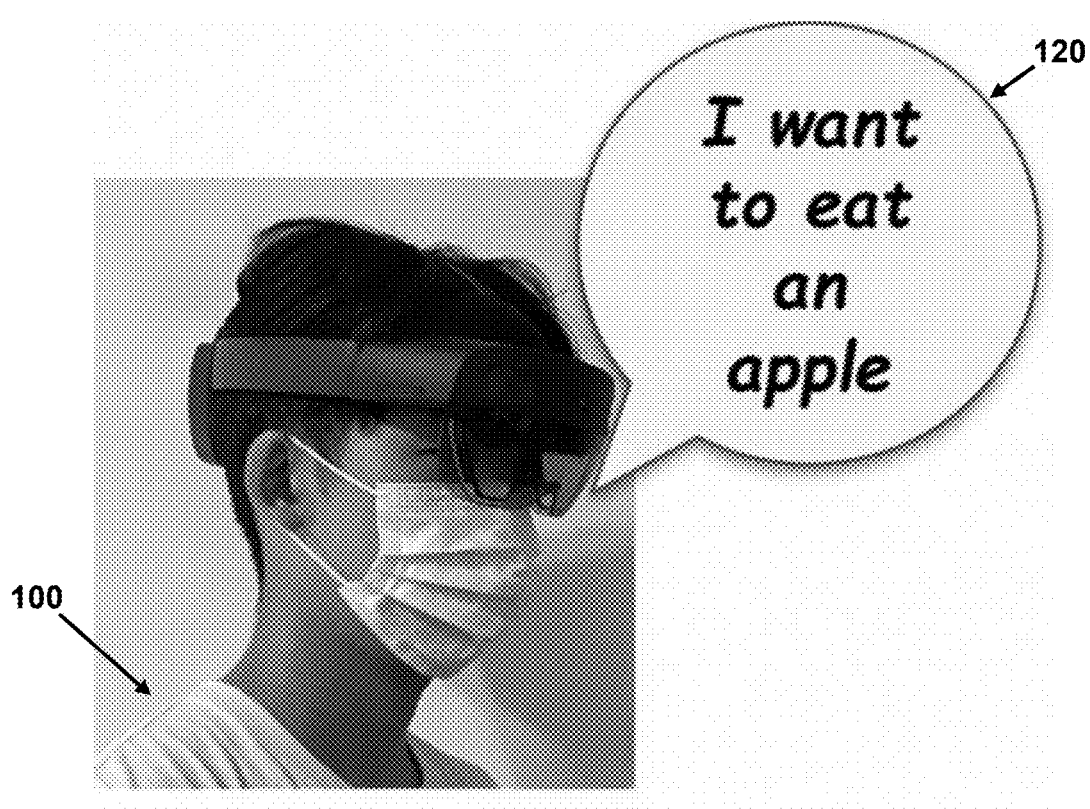
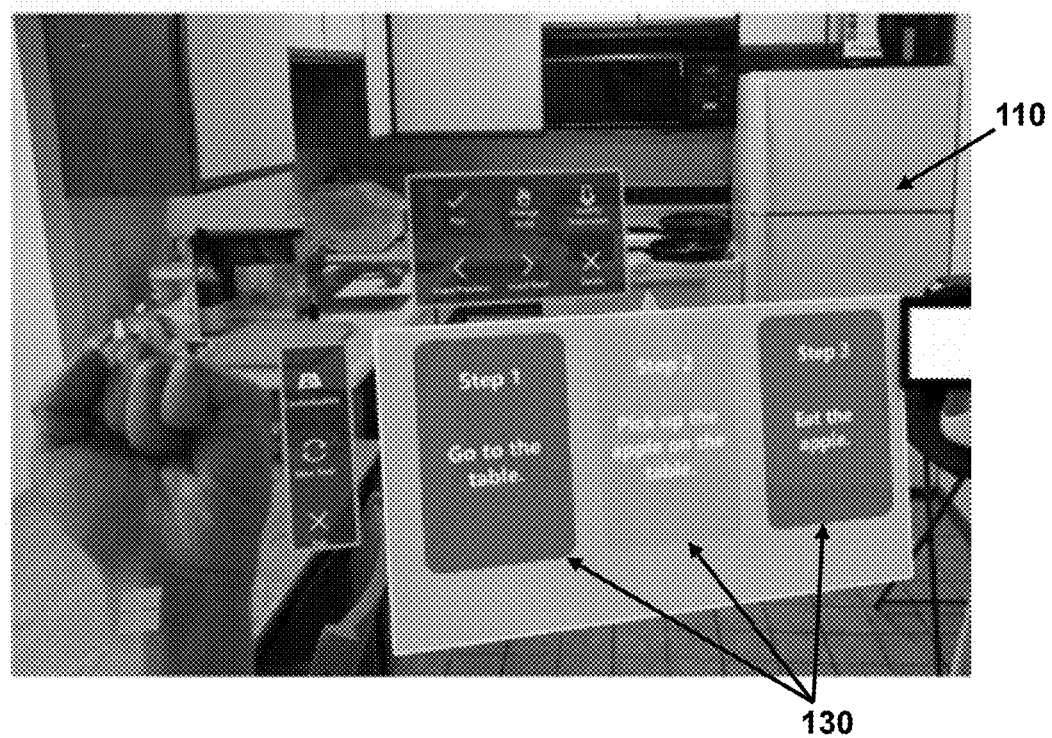
FIG. 1A

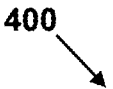

400

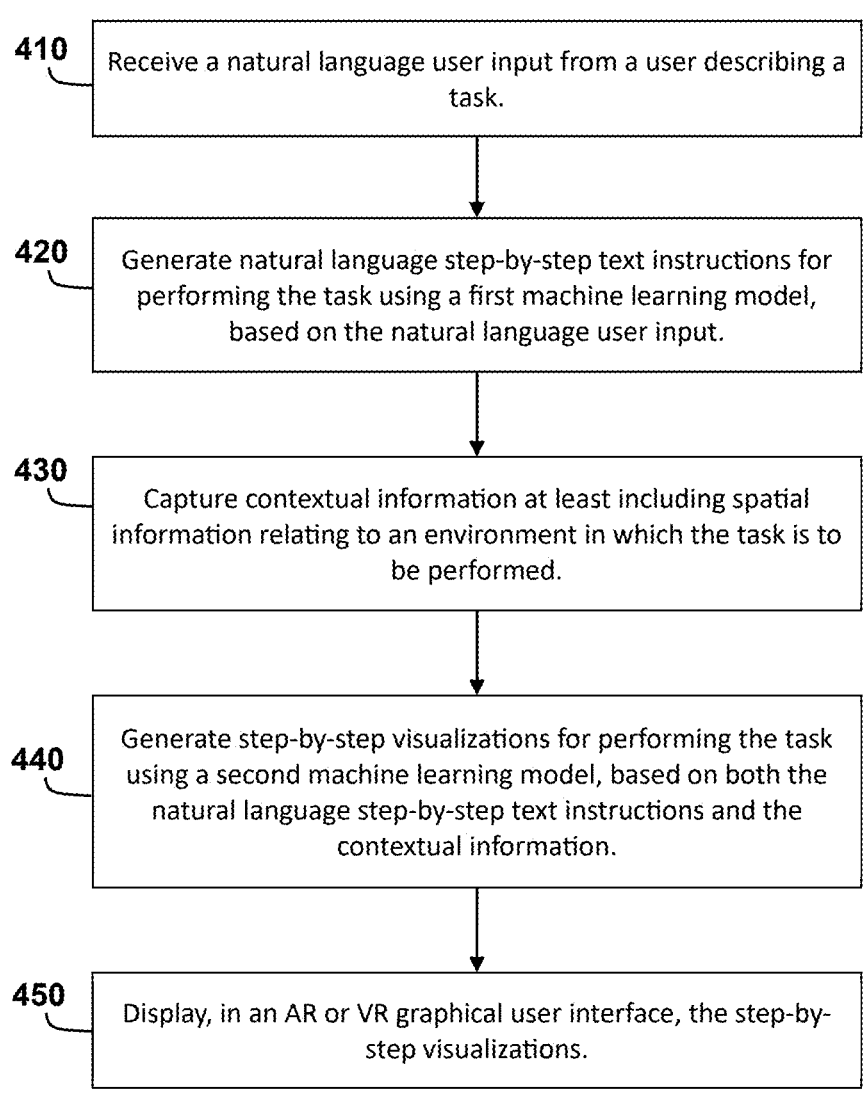

410 — Receive a natural language user input from a user describing a task.

420 — Generate natural language step-by-step text instructions for performing the task using a first machine learning model, based on the natural language user input.

430 — Capture contextual information at least including spatial information relating to an environment in which the task is to be performed.

440 — Generate step-by-step visualizations for performing the task using a second machine learning model, based on both the natural language step-by-step text instructions and the contextual information.

450 — Display, in an AR or VR graphical user interface, the step-by-step visualizations.

FIG. 4

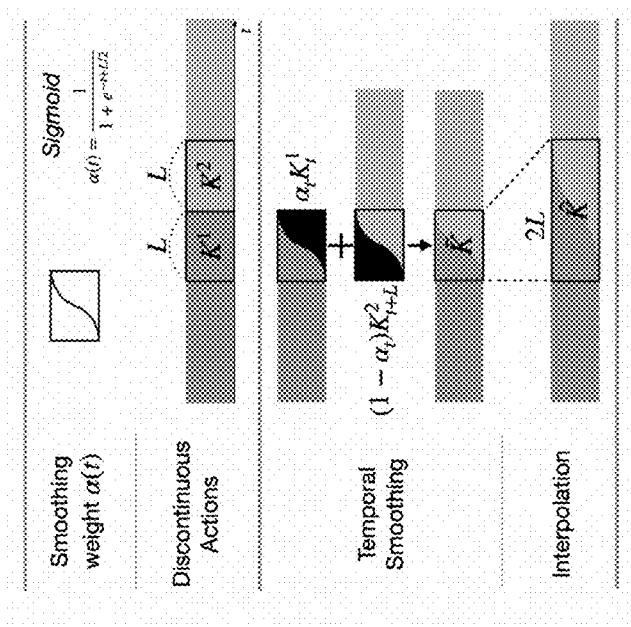

Algorithm 1 Temporal smoothing

INPUT: $K_t^1, K_t^2$      ▷ Transition segments $\alpha_t$      ▷ Temporal smoothing function

OUTPUT: $\hat{K}$      ▷ New transition segments

1: for $t = 0, 1, ..., L - 1$ do      ▷ Temporal smoothing
2:    $\tilde{K}_t = \alpha_t K_t + (1 - \alpha_t) K_t$
3: end for
4: for $t = 0, 1, ..., 2L - 1$ do      ▷ Linear interpolation
5:    $x \leftarrow \frac{L-1}{2L-1} t, x_0 \leftarrow \lfloor \frac{L-1}{2L-1} t \rfloor, x_1 \leftarrow \lceil \frac{L-1}{2L-1} t \rceil$
6:
7:    $\hat{K}_t = \tilde{K}_{x_0} + \frac{\tilde{K}_{x_1} - \tilde{K}_{x_0}}{x_1 - x_0}(x - x_0)$
8:
9: end for

FIG. 9

SYSTEM AND METHOD FOR AUTHORING CONTEXT-AWARE AUGMENTED REALITY INSTRUCTION THROUGH GENERATIVE ARTIFICIAL INTELLIGENCE

This application claims the benefit of priority of U.S. provisional application Ser. No. 63/622,351, filed on Jan. 18, 2024 the disclosure of which is herein incorporated by reference in its entirety.

GOVERNMENT LICENSE RIGHTS

This invention was made with government support under contract number DUE1839971 awarded by the National Science Foundation. The government has certain rights in the invention.

FIELD

The device and method disclosed in this document relate to augmented reality and, more particularly, to authoring context-aware augmented reality instruction through generative artificial intelligence.

BACKGROUND

Unless otherwise indicated herein, the materials described in this section are not admitted to be the prior art by inclusion in this section.

Augmented Reality (AR) instructions provide an interactive and immersive learning experience by rendering digital content onto physical objects or environments, enabling users to visualize complex concepts or procedures, explore various scenarios, and practice skills in a more realistic and context-rich setting. AR instructions can be accessed using different platforms in the form of various modalities. Due to their vast capabilities and their potential to enhance user engagement, facilitate learning, and improve performance in various contexts, AR instructions have gained considerable attention in a range of fields.

In domains in which AR instructions for human motion are necessary, animated humanoid avatars have been favored and widely applied as an expressive visualization technique in AR. To author animated humanoid avatars, one can program through keyframe animation or inverse kinematics in development platforms such as Unity, Unreal Engine, or Blender. However, these methods have been criticized for their requirement that the author have expertise in both the subject matter of the instructions and the programming for animation.

To overcome the low-level programming requirements for authoring animated humanoid avatars, a promising alternative is authoring through embodied demonstration (i.e. creating or editing digital content in AR environments by physically interacting or demonstrating actions in the real world). It is proven to enhance realism, provide code-less efficiency in creation, increase engagement, enhance interactions, and improve learning and training gains in AR instruction applications. However, despite the benefits and simplicity for the authors, authoring by embodied demonstrations is still subject to real-world human motion and hardware requirements for motion capture.

The very rapid and exponential development of Generative Artificial Intelligence (Gen-AI) has brought AI-generated content into the discussion of authoring AR instructions, considering its potential to eliminate expertise barriers and hardware requirements. With the rapid growth of Gen- AI, content creation in various modalities can be democratized at higher levels. Among prior examples are those where users are enabled to generate desired content by simply prompting via intuitive modalities (e.g., textual conversation). Many ongoing research endeavors and discussions have identified opportunities for the deployment of AI-generated content in AR for its overwhelming power of abstracting human knowledge and a wide range of I/O modalities.

However, some research has pointed out that Gen-AI lacks the contextual and background information necessary to be deployed into real-world applications. In the scope of AR instruction, contextual information is a critical metaphor. A taxonomy of context awareness in AR instruction, which many prior works converge towards, encompasses three key aspects: the human, the environment, and the system. Human context awareness enables the system to provide instructions that are adaptive to the users' profiles, social situations, or human states. Environmental context awareness merges the AR instructions with the physical world by considering the physical and semantic information in the environment. Finally, the system context depicts the state of the AR systems as well as their I/O, should be considered when given the next procedural instructions. All three aspects of context awareness are essential for grounding AI-generated content in AR instructional applications. However, current AI-generated content lacks the contextual information to adapt to varying application scenarios of AR instruction and is therefore has significant limitations for authoring instructional content.

SUMMARY

A method for generating augmented reality or virtual reality instructional content is disclosed. The method comprises receiving, via at least one input device, a natural language user input from a user describing a task. The method further comprises generating, with a processor, natural language step-by-step text instructions for performing the task using a first machine learning model, based on the natural language user input. The method further comprises capturing, with at least one sensor, contextual information at least including spatial information relating to an environment in which the task is to be performed. The method further comprises generating, with the processor, step-by-step animations of a virtual avatar performing the task using a second machine learning model, based on both the natural language step-by-step text instructions and the contextual information. The natural language step-by-step text instructions and the step-by-step animations of the virtual avatar are used by an augmented reality device or a virtual reality device to display augmented reality or virtual reality instructional content.

BRIEF DESCRIPTION OF THE DRAWINGS

The foregoing aspects and other features of the system and method are explained in the following description, taken in connection with the accompanying drawings.

FIGS. 1A-1C summarize a workflow of an AR instruction authoring system.

FIG. 4 shows a logical flow diagram for a method for generating augmented reality or virtual reality instructional content.

FIG. 9 shows the temporal smoothing algorithm of the AR instruction authoring system.

DETAILED DESCRIPTION

Figure 1B:

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Overview

Figure 1C:
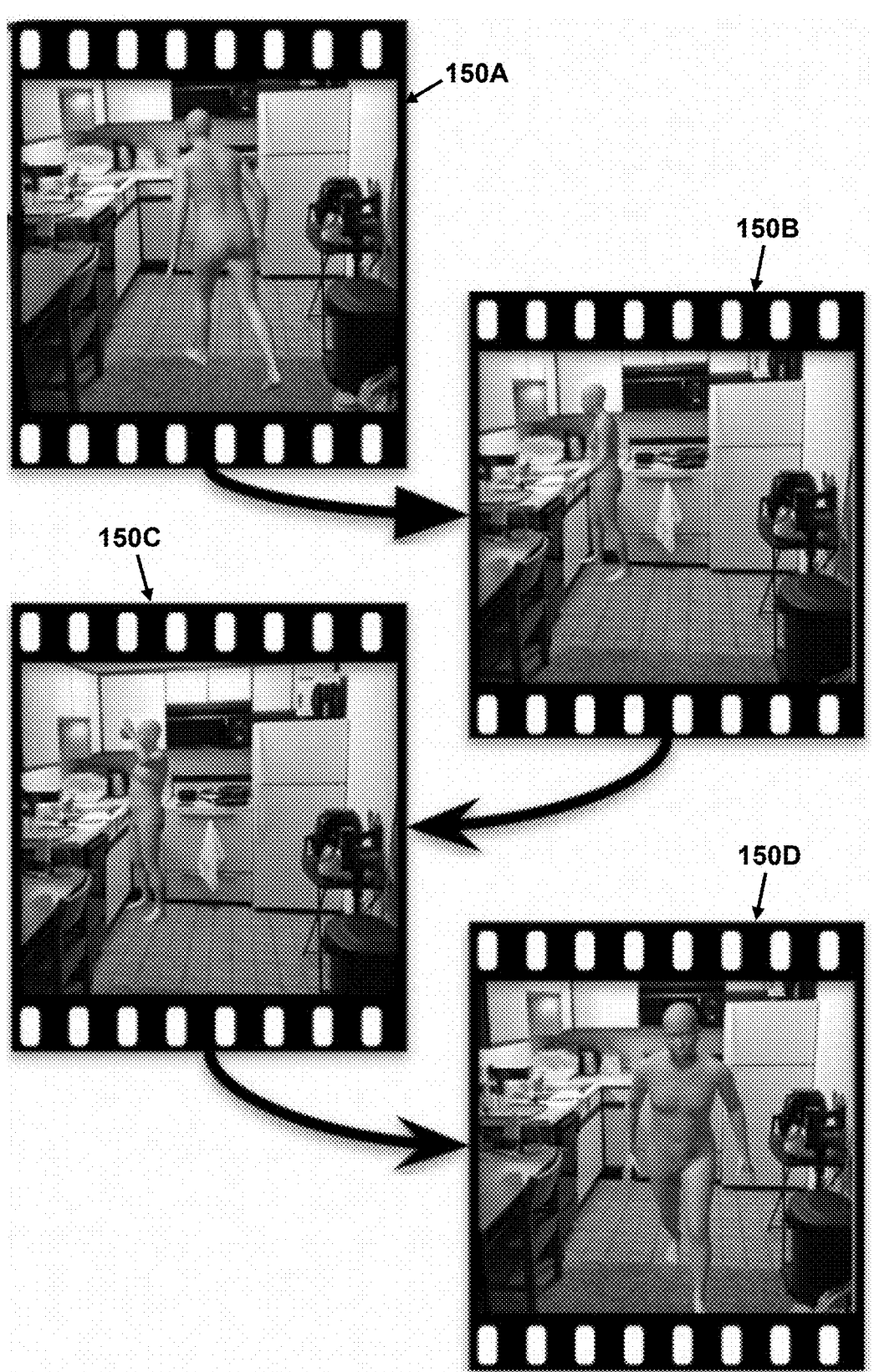

FIGS. 1A-1C summarize a workflow of an AR instruction authoring system 200. The AR instruction authoring system 200 enables authors to create context-aware AR instructional content without the need for motion capture or motion programming. Context-aware AR instruction enables adaptive, in-situ, and interactive experiences for learning and learners, by understanding the context and blending the physical reality with virtual content. The AR instruction authoring system 200 leverages Gen-AI techniques to simplify the generation of AR instructional content. Although the AR instruction authoring system 200 is primarily described with respect to generating AR instructional content using an AR system, it should be appreciated that the workflow and techniques described herein can likewise be applied to generate virtual reality (VR) instructional content using an AR system or a VR system.

The AR instruction authoring system 200 is designed with several design goals in mind. Firstly, the AR instruction authoring system 200 is designed to provide spatially aware content. The need for AI-generated content to be grounded in the real world for AR applications is evident. The AI-generated content provided by the AR instruction authoring system 200 is aware of the user's real-world environment which includes objects, their locations, and surfaces. Additionally, the AI-generated content provided by the AR instruction authoring system 200 provides avatar demonstrations that are always in the users' vicinity subject to a space where specific interactions and objects are located. Additionally, the AR instruction authoring system 200 is designed to provide smooth transition continuity. Particularly, the AI-generated content provided by the AR instruction authoring system 200 is smooth when transitioning from one event or interaction to another. Furthermore, the AR instruction authoring system 200 is designed to include different scales of demonstration that are adaptive to the different scales of the content in terms of movement, focusing on different parts of the instructions. This is achieved by giving users the freedom to decide whether they prefer to see the whole body (third-person view) or just the hands (first-person view) of a virtual avatar. Moreover, this will also decide the scale of the virtual avatar and virtual objects present in the scene. Finally, the AR instruction authoring system 200 is designed to provide flexibility in editing, regenerating, or removing instructional content, which is not otherwise enabled by the Gen-AI models themselves without designated interactions with the user.

With reference to FIG. 1A, a user 100 wears a head-mounted AR device 230 on his or her head to access an AR graphical user interface 110 provided by the head-mounted AR device 230. The user 100 provides a natural language input 120 to the AR instruction authoring system 200 by speaking aloud into a microphone, for example of the head-mounted AR device 230. More particularly, the user 100 speaks aloud to describe a task for which he or she would like to generate AR instructional content (e.g., "I want to eat an apple"). Based on the natural language input 120, the AR instruction authoring system 200 generates natural language step-by-step text instructions 130 for performing the task, which are displayed to the user 100 within the AR graphical user interface 110. The AR instruction authoring system 200 generates the natural language step-by-step text instructions 130 using a large language model, such as ChatGPT. The user 100 can interact with the AR graphical user interface 110 to edit and refine the natural language step-by-step text instructions 130 until they are satisfied.

With reference to FIG. 1B, the user 100 provides contextual information to the instructions by walking in the environment and capturing screenshots with the head-mounted AR device 230. By doing so, the user 100 naturally provides contextual information to the AR instruction authoring system 200, which aids in generating AR instructional content in the form of contextually-aware humanoid virtual avatar animations. As the user walks through the environment and captures screenshots, the AR instruction authoring system 200 captures spatial information regarding the environment and detects objects within the environment. In the illustrated example, the user walks through a kitchen 140 in which the task (i.e., eating an apple) is to take place. In this example, the kitchen 140 and the objects (e.g., an apple) within the kitchen provide the context for the task.

With reference to FIG. 1C, the AR instruction authoring system 200 generates AR instructional content in the form of contextually-aware humanoid virtual avatar animations. The AR instruction authoring system 200 advantageously leverages a diffusion-model-based algorithm to generate temporally smooth sequences of individually generated humanoid virtual avatar animations corresponding to each step. The AR instruction authoring system 200 temporally and spatially adapts the generated virtual avatar animations to the user 100, to the environment, and system context of the task. If necessary, the user 100 can also spatially edit the contextual information adaptively to provide a temporally smooth animation. In the illustrated example, the AR instruction authoring system 200 has generated a first animation 150A of a virtual avatar walking to a location of the apple in the kitchen, a second animation 150B of the virtual avatar grabbing the apple, a third animation 150C of the virtual avatar eating the apple, and a fourth animation 150D of the virtual avatar walking away from the kitchen.

The AR instruction authoring system 200 advantageously provides an AR interface for authoring AR instructional content from textual input describing the tasks, virtual avatar animation trajectory, and directional vision. In this way, the AR instruction authoring system 200 advantageously enables a code-free and motion capture-free experience for authoring AR instructional content using Gen-AI. The AR instruction authoring system 200 advantageously overcomes the contextual barrier and enables a user to author context-aware instructions with Gen-AI. By understanding the context and blending the physical reality with virtual components, the AR instruction authoring system 200 provides a new modality to render AR using text in a generative AI form. Thus, the AR instruction authoring system 200 advantageously fills the gap between the AI-generated humanoid virtual avatar animation and AR instructional applications, by contextualizing the generated content via author interactions.

Exemplary Hardware and Software Components

Figure 2:
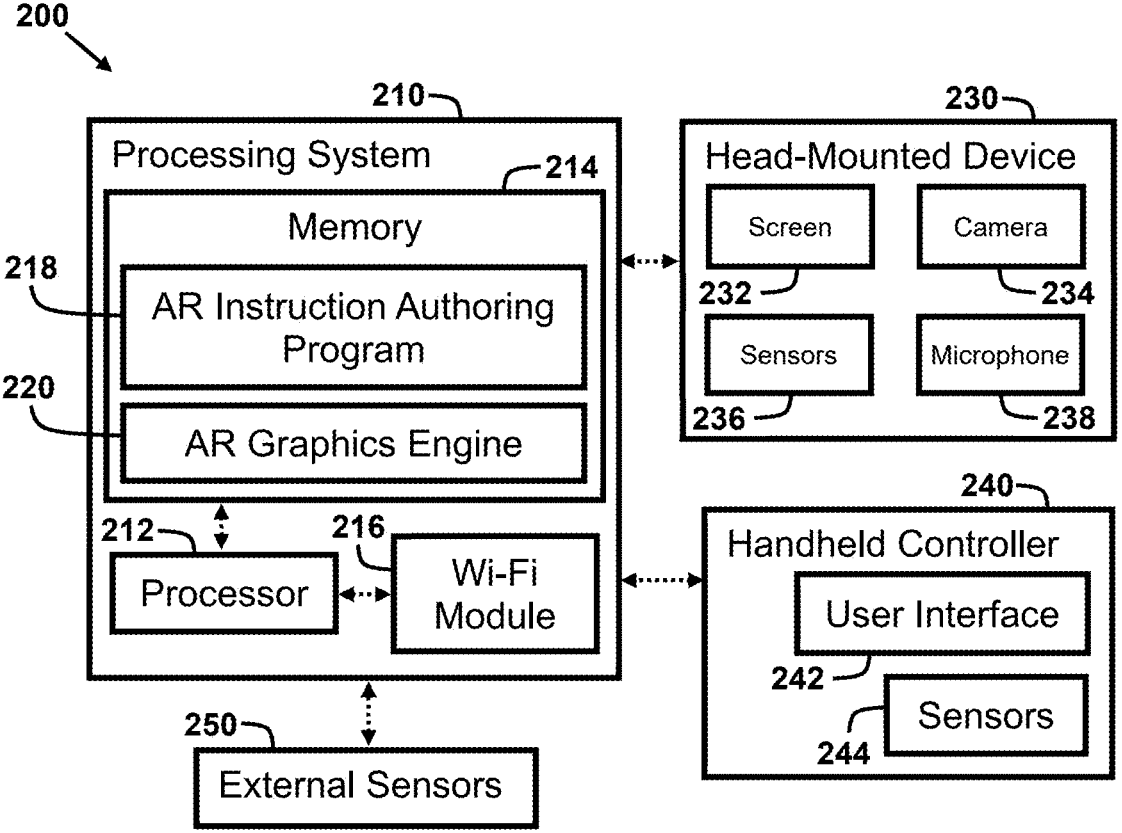
FIG. 2 shows exemplary components of the AR instruction authoring system.

FIG. 2 shows exemplary components of the AR instruction authoring system 200. It should be appreciated that the components of the AR instruction authoring system 200 shown and described are merely exemplary and that the AR instruction authoring system 200 may comprise any alternative configuration. Moreover, in the illustration of FIG. 2, only a single AR system is shown. However, in practice, the AR instruction authoring system may include one or multiple AR systems.

In the illustrated exemplary embodiment, the AR instruction authoring system 200 includes a processing system 210 and the head-mounted AR device 230 (e.g., Microsoft's HoloLens, Oculus Rift, or Oculus Quest). However, it should be appreciated that, in some embodiments, a tablet computer or mobile phone can be used in place of the head-mounted AR device 230. Thus, similar AR graphical user interfaces and features would be provided on the tablet computer or mobile phone. In some embodiments, the processing system 210 may comprise a discrete computer that is configured to communicate with the head-mounted AR device 230 via one or more wired or wireless connections. However, in alternative embodiments, the processing system 210 is integrated with the head-mounted AR device 230. In some embodiments, the AR instruction authoring system 200 further includes one or more hand-held controllers 240 (e.g., Oculus Touch Controllers) or hand-wearable controllers. Additionally, in some embodiments, the AR instruction authoring system 200 further includes external sensors 250 (e.g., Oculus IR-LED Sensors).

In the illustrated exemplary embodiment, the processing system 210 comprises a processor 212 and a memory 214. The memory 214 is configured to store data and program instructions that, when executed by the processor 212, enable the AR instruction authoring system 200 to perform various operations described herein. The memory 214 may be any type of device capable of storing information accessible by the processor 212, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism, or hardware component that processes data, signals, or other information. The processor 212 may include a system with a central processing unit, graphics processing units, multiple processing units, dedicated circuitry for achieving functionality, programmable logic, or other processing systems.

The processing system 210 further comprises one or more transceivers, modems, or other communication devices configured to enable communications with various other devices, at least including the head-mounted AR device 230, the hand-held controllers 240, and the external sensors 250 (if applicable). Particularly, in the illustrated embodiment, the processing system 210 comprises a Wi-Fi module 216. The Wi-Fi module 216 is configured to enable communication with a Wi-Fi network and/or Wi-Fi router (not shown) and includes at least one transceiver with a corresponding antenna, as well as any processors, memories, oscillators, or other hardware conventionally included in a Wi-Fi module. It will be appreciated, however, that other communication technologies, such as Bluetooth, Z-Wave, Zigbee, or any other radio frequency-based communication technology or wired communication technology can be used to enable data communications between devices in the AR instruction authoring system 200.

The head-mounted AR device 230 is in the form of an AR or virtual reality (VR) headset, generally comprising a display screen 232 and a camera 234. The camera 234 may be an integrated or attached camera and is configured to capture a plurality of images of the environment as the head-mounted AR device 230 is moved through the environment by the user. The camera 234 is configured to generate image frames of the environment, each of which comprises a two-dimensional array of pixels. Each pixel has corresponding photometric information (intensity, color, and/or brightness). In some embodiments, the camera 234 is configured to generate RGB-D images in which each pixel has corresponding photometric information and geometric information (depth and/or distance). In such embodiments, the camera 234 may, for example, take the form of two RGB cameras configured to capture stereoscopic images, from which depth and/or distance information can be derived, or an RGB camera with an associated IR camera configured to provide depth and/or distance information.

The display screen 232 may comprise any of various known types of displays, such as LCD or OLED screens. In at least one embodiment, the display screen 232 is a transparent screen, through which a user can view the outside world, on which certain graphical elements are superimposed onto the user's view of the outside world. In the case of a non-transparent display screen 232, the graphical elements may be superimposed on real-time images/video captured by the camera 234. In further embodiments, the display screen 232 may comprise a touch screen configured to receive touch inputs from a user.

In some embodiments, the head-mounted AR device 230 may further comprise a variety of sensors 236. In some embodiments, the sensors 236 include sensors configured to measure one or more accelerations and/or rotational rates of the head-mounted AR device 230. In one embodiment, the sensors 236 comprise one or more accelerometers configured to measure linear accelerations of the head-mounted AR device 230 along one or more axes (e.g., roll, pitch, and yaw axes) and/or one or more gyroscopes configured to measure rotational rates of the head-mounted AR device 230 along one or more axes (e.g., roll, pitch, and yaw axes). In some embodiments, the sensors 236 may include inside-out motion tracking sensors configured to track the human body motion of the user within the environment, in particular positions and movements of the head and hands of the user.

In some embodiments, the head-mounted AR device 230 may further comprise a microphone 238. The microphone 238 is configured to capture sounds, such as words spoken by the user 100, and provide them to the processing system 210. In some embodiments, the AR instruction authoring system 200 may include a variety of other input devices, such as buttons, keyboards, and the like.

The head-mounted AR device 230 may also include a battery or other power source (not shown) configured to power the various components within the head-mounted AR device 230, which may include the processing system 210, as mentioned above. In one embodiment, the battery of the head-mounted AR device 230 is a rechargeable battery configured to be charged when the head-mounted AR device 230 is connected to a battery charger configured for use with the head-mounted AR device 230.

In the illustrated exemplary embodiment, the hand-held controllers 240 comprises a user interface 242 and sensors 244. The user interface 242 comprises, for example, one or more buttons, joysticks, triggers, or the like configured to enable the user to interact with the AR instruction authoring system 200 by providing inputs. In one embodiment, the sensors 244 may comprise one or more accelerometers configured to measure linear accelerations of the hand-held controllers 240 along one or more axes and/or one or more gyroscopes configured to measure rotational rates of the hand-held controllers 240 along one or more axes. The hand-held controllers 240 further include one or more trans- ceivers (not shown) configured to communicate inputs from the user to the processing system 210. In some embodi- ments, rather than being grasped by the user, the hand-held controllers 240 are instead hand-wearable controllers, e.g., in the form of a glove, which are worn by the user and the user interface includes sensors for detecting gesture-based inputs or the like.

The program instructions stored on the memory 214 include an AR instruction authoring program 218. As dis- cussed in further detail below, the processor 212 is config- ured to execute the AR instruction authoring program 218 to enable the user to author context-aware AR instructional content. In one embodiment, the program instructions stored on the memory 214 further include an AR graphics engine 220 (e.g., Unity3D engine), which is used to render the intuitive visual interface of the AR instruction authoring program 218. Particularly, the processor 212 is configured to execute the AR graphics engine 220 to superimpose on the display screen 232 graphical elements for the purpose of authoring context-aware AR instructional content. In the case of a non-transparent display screen 232, the graphical elements may be superimposed on real-time images/video captured by the camera 234.

Design Space

Figure 3:
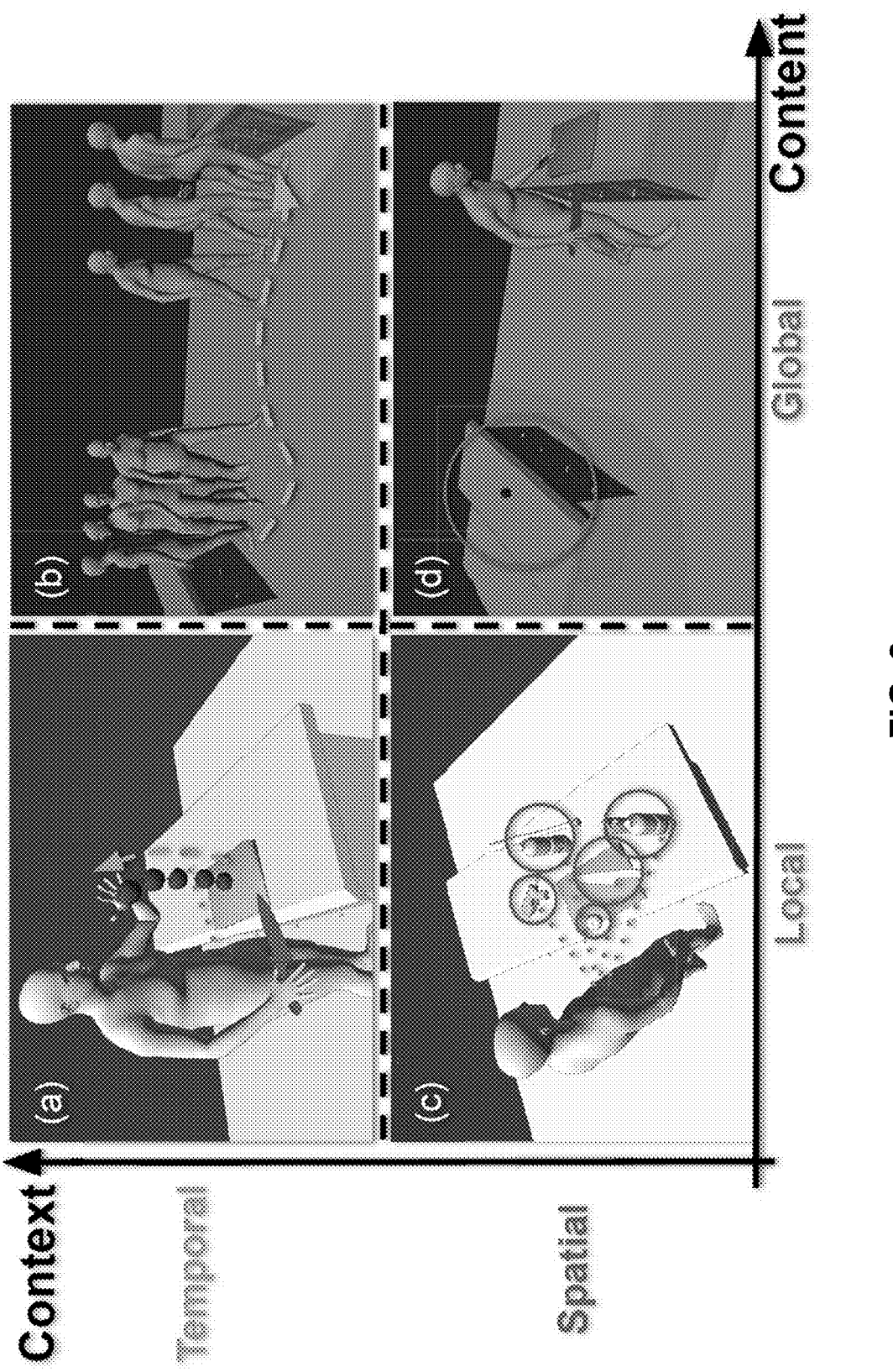
FIG. 3 shows a summary of the design space leveraged by the AR instruction authoring system.

FIG. 3 shows a summary of the design space leveraged by the AR instruction authoring system 200. Particularly, the design space of AI-generated content in AR (or VR) instruc- tional content can be broken down across two dimensions: context and content. AR instructional content can be either temporal or spatial depending on the contextual information it conveys. Similarly, AR instructional content can be either local or global depending on the scale of the content it contains. To provide a better understanding of the design space, the following definitions are provided The first dimension is the context of the instructional content, which can be either spatial or temporal. As used herein, the term "spatial context" refers to information related to the physical environment which involves location, objects, and their interactions within the instructional con- tent. As used herein, the term "temporal context" refers to the synchronization and timing of information conveyed by the instructional content.

The second dimension is the content of the instructional content, which can be either global or local. As used herein, the term "local content" refers to the specific content of the instructional content constrained in the users' immediate vicinity, which is to be depicted in low-level details by the AI-generated content. As used herein, the term "global content" refers to the broader perspective of the content of the instructional content relating to the overall scope of the task, describing the high-level goals of steps.

The AR instruction authoring system 200 is, in part, designed based on the design space decomposition above. Particularly, the AR instruction authoring system 200 enables the generation of AR instructional content located in each of the quadrants divided by the two dimensions above.

In quadrant (a) of FIG. 3, local-temporal instructions are shown including AI-generated content in which a virtual avatar picks up an apple from a cutting board on a table. As used herein, the term "local-temporal instructions" refers to instructional content that reveals the timely order of inter- actions between the avatars and the vicinity. Such instruc- tions illustrate step-by-step instructions for each interaction or action with temporally consistent transitioning from one to another.

In quadrant (b) of FIG. 3, global-temporal instructions are shown including AI-generated content in which a virtual avatar moves from one table to another table. As used herein, the term "global-temporal instructions" refers to AR instruc- tions that guide the end-users from one space into another and change the vicinity of the end-users with temporally consistent transitions.

In quadrant (c) of FIG. 3, local-spatial instructions are shown including AI-generated content in which the virtual avatar stands in front of a table and observes the objects located in the vicinity. As used herein, the term "local-spatial instructions" refers to instructional content that explains users' closest vicinity information about the objects, loca- tions, their semantic information, and their relation with each other. Such instructions locate and align the 3D object models and humanoid virtual avatars with the corresponding physical objects or areas.

In quadrant (d) of FIG. 3, global-spatial instructions are shown including AI-generated content in which an apple is located on a table on another side of a room from the virtual avatar. As used herein, the term "global-spatial instructions" refers to instructional content that depicts the approximate whereabouts of the objects, areas, or interactions that are positioned outside the local vicinity. In contrast to local- spatial instructions, global-spatial instructions posit the con- tent approximately in a space rather than detailing the exact location in the space.

Methods for Generating Context-Aware AR Instructional Content

A variety of methods, workflows, and processes are described below for enabling the operations and interactions of the AR instruction authoring system 200. In these descrip- tions, statements that a method, workflow, processor, and/or system is performing some task or function refers to a controller or processor (e.g., the processor 212) executing programmed instructions (e.g., the AR instruction authoring program 218, the AR graphics engine 220) stored in non- transitory computer-readable storage media (e.g., the memory 214) operatively connected to the controller or processor to manipulate data or to operate one or more components in the AR instruction authoring system 200 to perform the task or function. Additionally, the steps of the methods may be performed in any feasible chronological order, regardless of the order shown in the figures or the order in which the steps are described.

Additionally, various AR graphical user interfaces are described for operating the AR instruction authoring system 200. In many cases, the AR graphical user interfaces include graphical elements that are superimposed onto the user's view of the outside world or, in the case of a non-transparent display screen 232, superimposed on real-time images/video captured by the camera 234. In order to provide these AR graphical user interfaces, the processor 212 executes instructions of the AR graphics engine 220 to render these graphical elements and operates the display screen 232 to superimpose the graphical elements onto the user's view of the outside world or onto the real-time images/video of the outside world. In many cases, the graphical elements are rendered at a position that depends upon positional or orientation information received from any suitable combination of the sensors 236, the camera 234, the sensors 244, and the external sensors 250, so as to simulate the presence of the graphical elements in the real-world environment. However, it will be appreciated by those of ordinary skill in the art that, in many cases, an equivalent non-AR graphical user interface can also be used to operate the head-mounted AR device 230, such as a user interface provided on a further computing device such as laptop computer, tablet computer, desktop computer, or a smartphone.

Moreover, various forms of motion tracking are described in which spatial positions and motions of the user or of other objects in the environment are tracked. In order to provide this tracking of spatial positions and motions, the processor 212 executes instructions of the AR graphics engine 220 to receive and process sensor data from any suitable combination of the sensors 236, the camera 234, the sensors 244, and the external sensors 250, and may optionally utilize visual and/or visual-inertial odometry methods such as simultaneous localization and mapping (SLAM) techniques.

Finally, in order to enable the workflows and processes discussed herein, the AR instruction authoring system 200 provides a variety of AR graphical user interfaces. In order to provide these user interactions, the processor 212 may render interactive graphical elements in the AR graphical user interface, receive user inputs from the user, for example via gestures performed in view of one of the cameras 234 or other sensor, and execute instructions of the AR instruction authoring program 218 to perform some operation in response to the user inputs. The AR graphical user interfaces include all the functionality discussed herein and additional functionality such as visualization, editing, and modifying the content. In one embodiment, the AR graphical user interfaces of the AR instruction authoring system 200 consists of four modes: 1) Task Mode to generate the step-by-step instructions based on a user input, 2) Scan Mode to ground the instructions in the context, 3) Author Mode to design and edit textual instruction and avatar motion content, and 4) View Mode to examine the authored AR avatar instructions.

FIG. 4 shows a logical flow diagram for a method 400 for generating augmented reality or virtual reality instructional content. The method 400 advantageously provides an AR graphical user interface for generating AR instructional content for performing a task from user-input text descriptions of the task. The method 400 advantageously leverages Gen-AI to enable a code-free and motion-capture-free experience for authoring the AR instructional content, including virtual avatar animations demonstrating performance of the steps of the task. Additionally, the method 400 advantageously overcomes the contextual barrier by enabling the user to author context-aware instructions that understand the context and blend physical reality with virtual components.

The method 400 begins with receiving a natural language user input from a user describing a task (block 410). Particularly, the processor 212 receives, via at least one input device, a natural language user input from a user describing a task for which AR instructional content is to be generated. In at least one embodiment, the microphone 238 of the head-mounted AR device 230 records the user speaking the natural language user input into the microphone 238. The processor 212 transcribes the spoken natural language recording into a text format for processing by the AR instruction authoring program 218, for example using a speech-to-text algorithm. It should be appreciated, however, that the natural language user input may be received in a variety of other manners, such as typing into a keyboard of the AR instruction authoring system 200 or reading from a text file stored in the memory 214.

Figure 5:
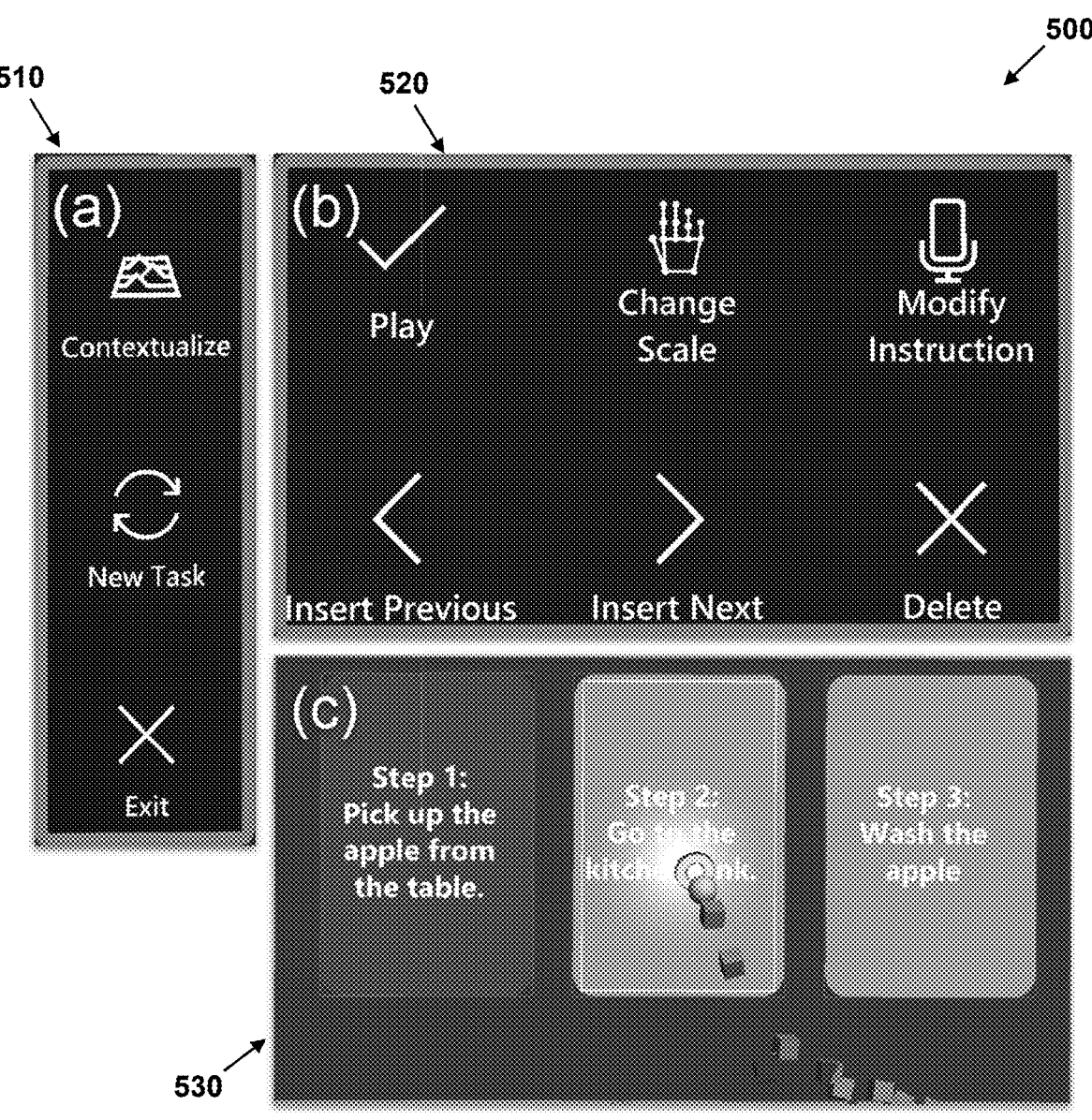
FIG. 5 shows an exemplary AR graphical user interface of the AR instruction authoring system.

FIG. 5 shows an exemplary AR graphical user interface 500 of the AR instruction authoring system 200. The processor 212 operates the display screen 232 to display the AR graphical user interface 500 superimposed on the environment of the user. As shown in illustration (a), the AR graphical user interface 500 includes an AR main menu 510. In one embodiment, the AR main menu 510 is always present in the user's view on his or her left hand so that he or she can easily access all functions of the current mode and also switch between them. The user first starts authoring a new task by providing the task description using a voice command by clicking the New Task button in the AR main menu 510. Upon pressing the New Task button, the AR instruction authoring system 200 enters the Task Mode, in which the user can speak into the microphone 238 to provide a natural language user input that describes the task for which AR instructional content is to be generated.

Returning to FIG. 4, the method 400 continues with generating natural language step-by-step text instructions for performing the task using a first machine learning model, based on the natural language user input (block 420). Particularly, based on the natural language user input, the processor 212 generates natural language step-by-step text instructions for performing the task using a first machine learning model. The natural language step-by-step text instructions include an ordered sequence of steps for performing the task that may, for example, be numbered to indicate the sequence in which the steps are to be performed to complete the task. In some embodiments, the first machine learning model is a language model configured to receive natural language prompts and generate natural language responses.

The processor 212 is configured to generate a natural language prompt based on the natural language user input that was received from the user. In some embodiments, the processor 212 forms the natural language prompt by combining the natural language user input with predefined prompt text configured to prompt the language model to output the natural language step-by-step text instructions for performing the task that is described in the natural language user input. In one example, the processor 212 generates the natural language prompt including predefined prompt text having a form similar to "Provide detailed step-by-step instructions for [task description]," where [task description] is the natural language user input given by the user. In this way, the language model is guided to provide a natural language response having natural language step-by-step text instructions for performing the task that is described in the natural language user input.

In some embodiments, to get accurate instructions that can be used to generate virtual avatar motions, the AR instruction authoring system 200 utilizes prompt engineering techniques to guide the output of the language model. Particularly, in some embodiments, the predefined prompt text includes a list of action labels and is configured to prompt the language model to provide step-by-step text instructions having steps with text instructions incorporating action labels from the predefined list of action labels. For example, the natural language prompt includes predefined prompt text having a form similar to "Provide detailed step-by-step instructions for [task description]. Provide each step using one of the following action words: [action label set]," where [action label set] is the predefined list of action labels. The predefined list of action labels includes common action verbs such as "pick," "place," "cut," "hold," and other such action verbs. The predefined list of action labels may, for example, be adapted from the action labels present in the HumanML3D dataset (a large computer vision benchmark dataset that has action classes). Thus, the language model is guided to incorporate these action labels into the generated instructions (i.e., generate textual instructions that use these action labels).

Once the natural language prompt is generated, the processor 212 provides the generated natural language prompt to the language model for processing. After inputting the natural language prompt into the language model, the processor 212 receives a natural language response from the language model that is responsive to the provided natural language prompt and, in particular, includes the natural language step-by-step text instructions.

The language model is a machine learning-based model, for example in the form of an artificial neural network. The language model is configured to receive natural language text as an input prompt and generate natural language text as an output response. In at least some embodiments, the language model is a large language model (LLM), such as OpenAI's ChatGPT™, Google's Gemini™, or Anthropic's Claude™. An LLM is a generative machine learning model that is trained on vast amounts of textual data to understand and generate human-like responses to natural language prompts. These models are designed to predict and produce coherent and contextually relevant text, imitating human language fluency. They work by analyzing patterns in language data, learning grammar, context, and meaning, and then using that knowledge to generate new content.

In general, the LLM is implemented by a third-party server rather than being executed directly by the AR instruction authoring system 200. Instead, the AR instruction authoring system 200 interfaces with the LLM via Internet communications using an API. Particularly, once the natural language prompt is finalized, the processor 212 operates the Wi-Fi module 216 to transmit a message including the natural language prompt to a server hosting the LLM. In response, the processor 212 receives via the Wi-Fi module 216 a natural language response from the LLM that includes text that is responsive to the natural language prompt and which includes the natural language step-by-step text instructions. However, in alternative embodiments, the processing system 210 stores the LLM and executes the LLM to generate the natural language response locally.

Table 1 below includes a variety of exemplary tasks and corresponding step-by-step instructions that might be generated by a language model for those tasks. As can be seen, the step-by-step instructions (right) are much more detailed than the task description (left) initially provided by the user and provide the necessary detail to generate virtual avatar animations representing a performance of the task.

TABLE 1

| TASK | STEP-BY-STEP INSTRUCTIONS |
|---|---|
| Charging a Phone | Get the charger; Insert the cable into the phone; Plug the charger into an outlet. |
| Turning on the TV | Pick up the remote; Point it at the TV; Press the power button. |
| Closing a Window | Approach the window; Grasp the handle or sash; Push to close. |
| Starting a Computer | Sit in front of the computer; Press the power button; Wait for it to boot up. |
| Exercising | Crawl; Run; Band Push; Crawl to Stand |
| Reading a Book | Walk to the bookshelf; Choose a book; Go to the living room; Sit on the couch or chair; |
| Closing a Window | Approach the window; Grasp the handle or sash; Push or slide to close. |
| Eating an apple | Approach the table; Pick up the remote; Eat the apple; Move back; Turn around; Leave the kitchen. |
| Use 3D printer | Pick up PVA; Go to the printer; Attach Filament to the printer; Start the printer. |
| Making Tea | Boil the water; Place a cup on the table; Pick the port; Pour boiling water into the cup. |

After the natural language step-by-step text instructions are initially generated by the language model, they are provided to the user for review and editing. In some embodiments, the processor 212 modifies the natural language step-by-step text instructions based on a user input received via at least one input device, for example via interactions with the AR graphical user interfaces. This step allows the user to make any necessary adjustments, add more details, or remove information to ensure the instructions align with their specific needs (for example, if the step-by-step text instructions incorporate an object that is not present in the environment, then the instructions can be adapted accordingly).

With reference again to FIG. 5, after the AR instruction authoring system 200 generates the natural language step-by-step text instructions, the system enters the Author Mode in which the step-by-step text instructions are displayed to the user within the AR graphical user interface 500. Particularly, as shown in illustration (c), the AR graphical user interface 500 includes an instruction panel 530 which displays the step-by-step text instructions. The user can select one or more steps in the step-by-step text instructions using a cursor 540, that is controlled for example using motions or gestures of the user's right hand.

Additionally, as shown in illustration (b), in the Author Mode, the AR graphical user interface 500 includes an editing menu 520 that enables the user to, among other things, edit the step-by-step text instructions. Particularly, when a respective step has been selected via the instruction panel 530, the user can press an Insert Previous button or an Insert Next button to add a new step prior to the selected step or subsequent to the selected step, respectively. Additionally, the user can press a Modify Instruction button to modify the selected step. Particularly, after pressing the Modify Instruction button the user speaks into the microphone 238 to record further natural language input that is converted to text and replaces the selected step. Finally, the user can press the Delete button to remove the selected step from the step-by-step text instructions.

The method 400 continues with capturing contextual information at least including spatial information relating to an environment in which the task is to be performed (block 430). Particularly, the processor 212 operates a suitable combination of the sensors 236, the camera 234, the sensors 244, and the external sensors 250 to capture contextual information from the environment in which the task is to be performed and in which the AR instructional content is to be provided. The contextual information at least includes spatial information relating to the environment. In some embodiments, the contextual information includes a map of the environment including spatial and/or geometric information describing features and structures of the environment. In at least some embodiments, the contextual information includes motion trajectories for performing steps of the task (e.g., a trajectory for walking from one location to another). In at least some embodiments, the contextual information includes information regarding objects detected within the environment, including global positions of the objects, poses of the objects, and semantic labels for the objects (i.e., a descriptive name identifying or classifying what the objects are).

With reference again to FIG. 5, after the user has finalized the natural language step-by-step text instructions, the user begins capturing contextual information using the AR instruction authoring system 200. The user first selects a step within the instruction panel 530 and then presses the Contextualize button in the AR main menu 510 to enter the Scan Mode and begin capturing contextual information.

Figure 6:
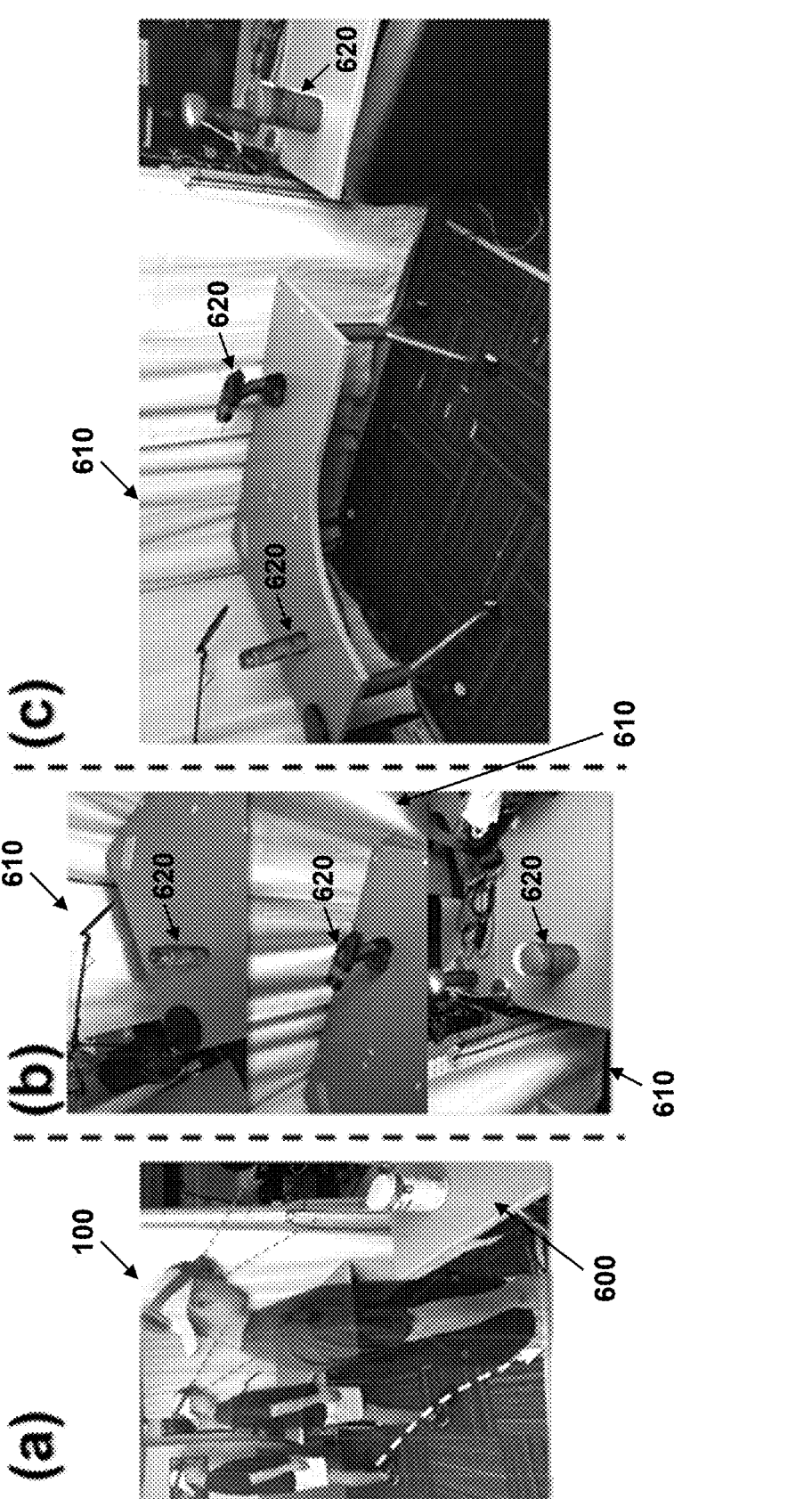
FIG. 6 shows the methodology for obtaining contextual information in the Scan Mode.

FIG. 6 shows the methodology for obtaining contextual information in the Scan Mode. To capture global contextual information, while wearing the head-mounted AR device 230, the user 100 simply walks through the environment to the location at which the selected step is to be performed, e.g., in front of a table 600, as shown in illustration (a). As the user navigates the environment, the camera 234 and the sensors 236 of the head-mounted AR device 230 capture both the visual content of the surroundings and the global position of the user 100 (e.g., using SLAM), enabling the head-mounted AR device 230 to map the physical environment and to detect objects located within the environment. Based on images captured by the camera 234 and based on sensor data captured by the sensors 236, the processor 212 determines spatial information of objects and structures in the environment and captures a motion trajectory of the user as the user navigates the environment to reach the location at which the selected step is to be performed. The captured motion trajectory and spatial positions of objects and structures are stored as contextual information associated with the selected step.

Next, to capture local contextual information, the user 100 looks at objects 620 in the local vicinity of the location at which the selected step is to be performed and operates the head-mounted AR device 230 to capture screenshots 610 of the spaces and objects 620 in the immediate vicinity, as shown in illustrations (b) and (c). The processor 212 processes the screenshots 610 captured manually by the user, as well as other images automatically captured during navigation of the environment, using an object detection algorithm to detect objects 620 in the environment. In particular, the processor 212 determines the global spatial positions of the objects 620 detected in the local environment, using an object detection algorithm (e.g., a detection model pre-trained on ImageNet) in combination with the global position of the user when the images are captured. Additionally, the processor 212 determines 6-DoF poses of the objects 620 detected in the local environment, using an object pose-estimation algorithm (e.g., a pre-trained MegaPose6D model). Finally, the processor 212 determines the semantic label for the objects 620 detected in the local environment (i.e., a descriptive name identifying or classifying what the objects are), using an object classification/labeling algorithm. The global locations, poses, and semantic labels for the objects 620 detected in the local environment are stored as contextual information associated with the selected step.

In at least some embodiments, the AR instruction authoring system 200 enables the user to capture contextual information for multiple steps at once by grouping together steps that are to be performed in the same context (i.e., in the local vicinity of a common location). The selected steps may be a subset of all of the steps, or in some cases may be all of the steps. With reference again to FIG. 5, the user selects and groups several steps that happen in the same context. The selected steps are highlighted in the instruction panel 530 (e.g., in yellow). In the illustrated example, the user has selected the step "Step 2: go to the kitchen sink" and a step "Step 3: wash the apple" because they both occur at the same location (i.e., the sink). Next, after selecting a group of steps that happen in the same context (i.e., in the local vicinity of a common location), the user clicks the Contextualize button in the AR main menu 510 and enters Scan Mode to scan the physical environment, as discussed above. The captured contextual information is stored as contextual information associated with the each step in the selected group of steps.

After detecting objects during the capture of contextual information, the processor 212 operates the display screen 232 to overlay a 3D virtual object on top of the physical object in the real-world environment. Particularly, based on the semantic label for each object, the processor 212 retrieves a corresponding 3D model for that type of object. In some embodiments, a database of 3D scans of the objects or 3D models is previously collected and stored in the memory 214. Next, the processor 212 overlays the virtual object upon the environment depending on the global location and the 6-DoF pose of the object, such that it appears to be overlaid on top of the physical object in the real-world environment. The user can interact with the AR graphical user interfaces to adjust and correct the global location and the 6-DoF pose of the virtual object using built-in freehand interactions. In one embodiment, the AR instruction authoring system 200 uses the Mixed Reality toolkit (MRTK) for the interactions of hands with virtual objects.

In the manner discussed above, the AR instruction authoring system 200 enables the user to iteratively capture context information for each step of the step-by-step instructions. With reference again to FIG. 5, in some embodiments, the steps that have been contextualized are highlighted in the instruction panel 530 (e.g., in green).

Next, the method 400 continues with generating step-by-step visualizations for performing the task using a second machine learning model, based on both the natural language step-by-step text instructions and the contextual information (block 440). Particularly, once the step-by-step text instructions are finalized and contextualized, the processor 212 generates step-by-step animations of a virtual avatar performing the task using a second machine learning model, based on both the natural language step-by-step text instructions for the task and the contextual information associated with the steps of the task. More particularly, the processor 212 generates a respective animation of the virtual avatar performing each respective step in the ordered sequence of step-by-step text instructions. In some embodiments, the second machine learning model is a text-to-motion model, as discussed in greater detail below.

For each step in the ordered sequence of step-by-step text instructions, the processor 212 inputs the text instruction for the respective step into the text-to-motion model to generate a respective animation of the virtual avatar performing the respective step. In some embodiments, each respective virtual avatar animation, denoted $$x^{1:N} = \{x^i\}_{i=1}^{N},$$

is a sequence of human poses represented by $x^i \in \mathbb{R}^{J \times D}$, where J is the number of joints and D is the dimension of the joint representation. The joint representations may either include joint locations, joint rotations, or both. Thus, the processor 212 generates a set of virtual avatar animations that can be combined together to provide a step-by-step visualization for performing the task in AR.

Figure 7:
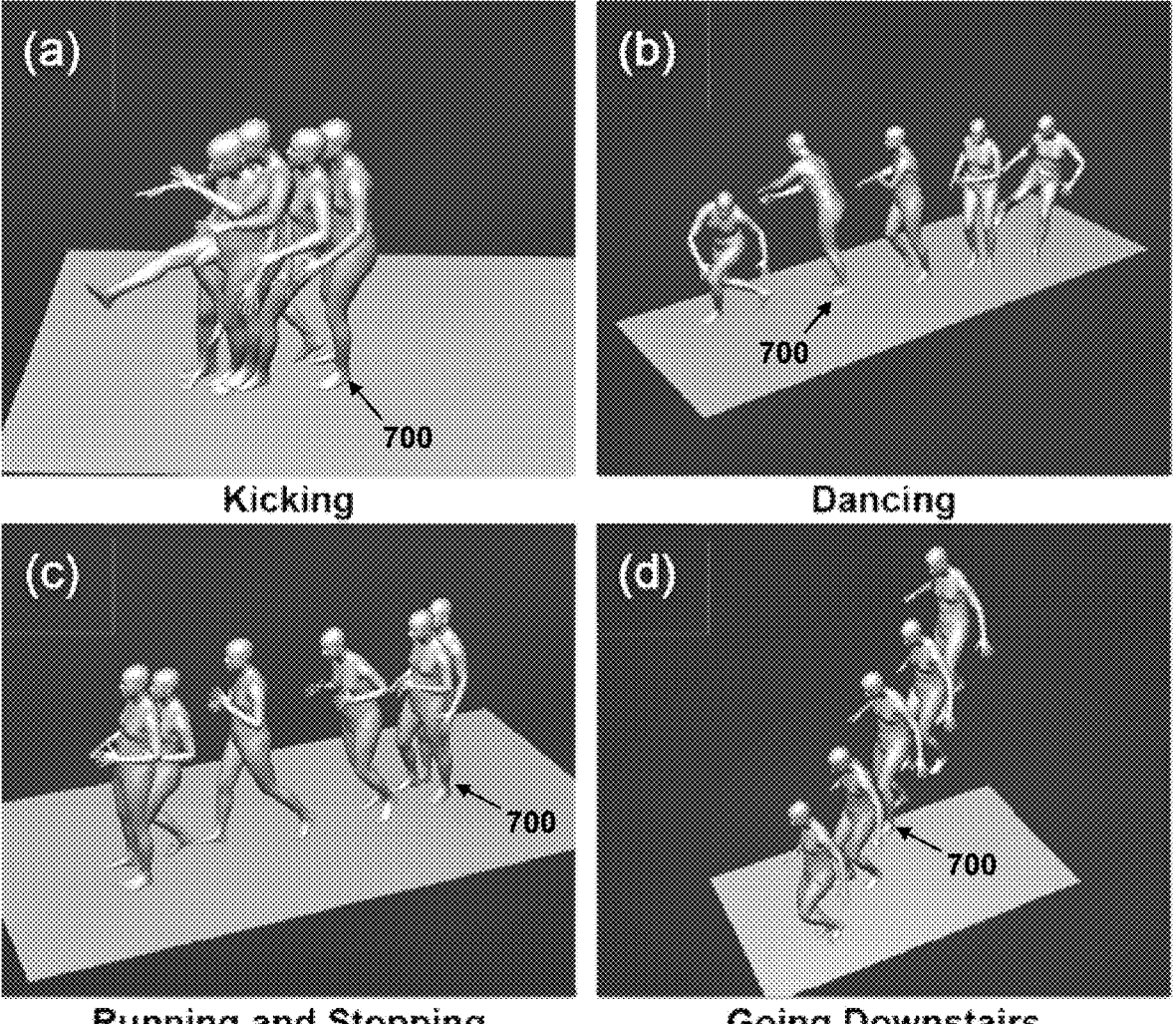
FIG. 7 shows exemplary virtual avatar animations generated by the text-to-motion model.

FIG. 7 shows exemplary virtual avatar animations generated by the text-to-motion model. As shown in illustration (a), a virtual avatar 700 is animated to perform a kicking motion. As shown in illustration (b), the virtual avatar 700 is animated to perform a dancing motion. As shown in illustration (c), the virtual avatar 700 is animated to perform a running and stopping motion. As shown in illustration (d), the virtual avatar 700 is animated to perform a going downstairs motion. As can be seen, the generated motions can be local motions in which the virtual avatar 700 stays in one place, as shown in illustration (a), or global motions in which the virtual avatar 700 moves from one place to another, as shown in illustrations (b), (c), and (d).

As discussed below, based on the contextual information collected for each respective step, the respective virtual avatar animations can be displayed in a manner realistically and correctly grounded in the spatial context and temporal context. Particularly, the respective virtual avatar animations can be rendered at the correct locations within the environment that were previously associated with the corresponding steps and can be shown to interact with objects located within the environment. Likewise, the virtual avatar animations can be combined together according to the ordered sequence of steps and in a manner that is temporally smooth.

In at least some embodiments, the text-to-motion model is a text-to-motion diffusion model. The text-to-motion diffusion model is a machine learning-based model, for example in the form of an artificial neural network, in particular one having a Transformer-based architecture. In one embodiment, the text-to-motion diffusion model used by the AR instruction authoring system 200 has an architecture that is similar to the Motion Diffusion Model (MDM) described in the publication "*Human motion diffusion model*" by Guy Tevet, Sigal Raab, Brian Gordon, Yonatan Shafir, Daniel Cohen-Or, and Amit H Bermano (2022). However, the architecture of the text-to-motion diffusion model used by the AR instruction authoring system 200 is modified compared to the MDM architecture.

Figure 8:
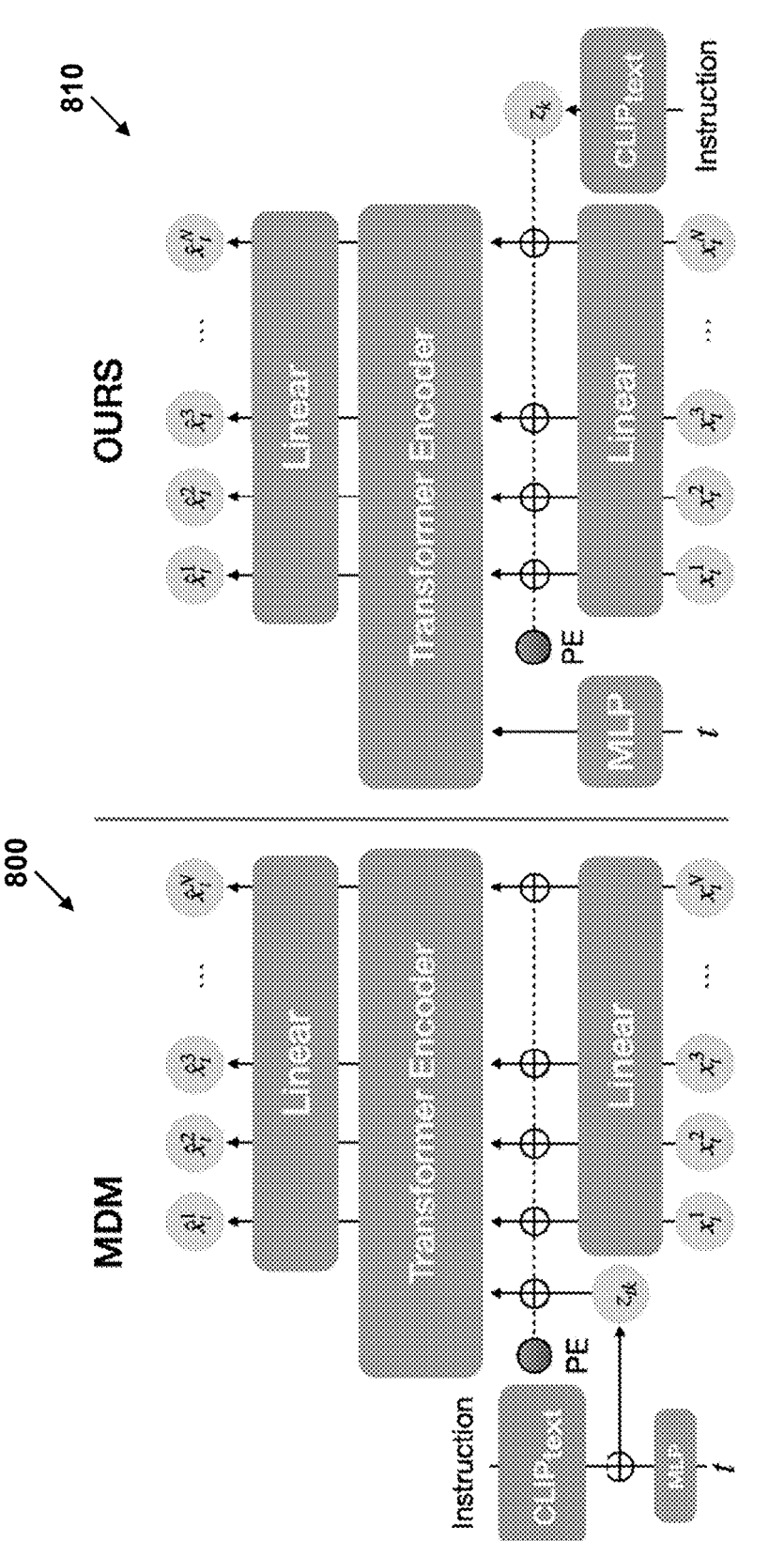
FIG. 8 compares the modified architecture of the text-to-motion diffusion model used by the AR instruction authoring system with that of the Motion Diffusion Model (MDM) architecture.

FIG. 8 compares the modified architecture of the text-to-motion diffusion model used by the AR instruction authoring system 200 with that of the Motion Diffusion Model (MDM) architecture. On the left, the MDM architecture 800 is shown. The MDM is fed a motion sequence $$x_t^{1:N}$$

of length N in a noising step t, as well as t itself and a conditioning code. The conditioning code is a CLIP-based textual embedding of text instructions that is projected together with t to provide an input token $z_{tk}$. For simplicity, the random masking of the text embedding used for classifier-free diffusion guidance is omitted from the illustration. As can be seen, the MDM architecture 800 conditions motion frames by placing $z_{tk}$ at the first location.

In contrast to the MDM architecture 800, the architecture 810 of the text-to-motion diffusion model used by the AR instruction authoring system 200 is shown on the right. The original MDM is designed to generate only a single action by conditioning the instruction into the whole sequence at once. However, the architecture 810 is configured to utilize input tokens, denoted by $z_k$, to condition instructions to each frame, allowing them to generate multiple action sequences. The input token $z_k$ is a CLIP-based embedding of text conditions including at least a portion of the natural language step-by-step text instructions. Particularly, the processor 212 determines the input tokens $z_k$ based on the respective text instructions for each step in the step-by-step instructions. Particularly, for the sampling process, the architecture 810 generates multiple actions by adding distinct input tokens that embed text conditions to the frames. As an example, for three actions each 60 frames long, the architecture 810 uses differing $z_k$ values across the ranges, such as 1-60, 61-120, and 121-180 frames. Thus, unlike the MDM architecture 800, which conditions motion frames by placing $z_{tk}$ at the first location, the architecture 810 conditions motion frames by adding $z_k$ to each motion embedding at each frame.

Additionally, the text-to-motion diffusion model used by the AR instruction authoring system 200 is adapted to incorporate the context information that was captured and associated with each step in the step-by-step text instructions. To these ends, the text-to-motion diffusion model used by the AR instruction authoring system 200 leverages techniques similar to those of the Guided Diffusion Model (GDM) that is described in the publication "*Guided Motion Diffusion for Controllable Human Motion Synthesis*" by Korrawe Karunratanakul, Konpat Preechakul, Supasorn Suwajanakorn, and Siyu Tang (2023). The GDM facilitates trajectory-guided and location-guided motion generation within the temporal context. The strength of the GDM lies in its ability to adeptly generate human motion using both text descriptions and location cues, offering a unique approach to motion generation with spatial guidance. The GDM methods are applied to generate multiple actions with smooth transitions. However, due to the limitation of the frame length of the training dataset, the quality of the motion drops when the frame number exceeds 196. Hence, the AR instruction authoring system 200 adopts a temporal smoothing algorithm (discussed below), which is applied after the generation of motions to generate an unlimited length of smooth avatar motion.

In some embodiments, the processor 212 is configured to generate the virtual avatar animations to include interactions by the virtual avatar with virtual objects corresponding to physical objects in the environment that are associated with respective virtual avatar animations or associated with the respective step of the task. The goal of interaction generation is to generate the motion of the hand with 3D virtual objects that are overlaid on 3D objects in the physical environment. The location of these objects is then used to guide their interaction of the virtual object with a virtual avatar hand. As discussed above, the locations and poses of objects in the environment are captured as context information. These objects are represented in the AR instructional content as virtual objects superimposed on the physical objects within the environment. The generated virtual avatar animations can be displayed to interact with these virtual objects based on the proximity between the virtual object and a hand joint in the generated virtual avatar animations. In some embodiments, in response to a hand joint of a virtual avatar animation being within a predetermined distance of a virtual object, the processor 212 renders the virtual object attached to the hand of the virtual avatar. For a practical example, during a "pick up an apple" action, if the virtual hand's center is less than 2 cm from that of the virtual apple, the virtual apple is attached to the virtual hand and appears to be held by the virtual hand.

In some embodiments, the processor 212 is configured to generate the virtual avatar animations in a temporal-context-aware manner. In some embodiments, the processor 212 forms a continuous animation by combining the respective virtual avatar animations for each respective step for performing the task. However, rather than simply concatenating the virtual avatar animations, which would lead to discontinuities, the processor 212 advantageously smooths transitions between the respective virtual avatar animations for each respective step for performing the task using a temporal smoothing algorithm.

FIG. 9 shows the temporal smoothing algorithm of the AR instruction authoring system 200. On the left, pseudocode for the temporal smoothing algorithm is shown. On the right, an illustrative visualization of the temporal smoothing algorithm is shown. The processor 212 utilizes a temporal smoothing function, (denoted as $f$) to mitigate the discontinuity among the transitional segments of motion ($K^1$ and $K^2$, where K represent two transition segments). Each of the transition segments comprises a length of L frames, at the beginning of a respective virtual avatar animation or at the end of a respective virtual avatar animation. The processor 212 also sets the weight function $\alpha_t$ to define the ratio for combining the two transition segments. For this purpose, the processor 212 employs the shifted sigmoid function for $\alpha_t$, given by $$\alpha(t) = \frac{1}{1 + e^{-(t(L/2))}},$$

to serve as our smoothing mechanism. Consequently, the resultant mixed frames, represented as $\check{K}_t$, can be expressed as:

$$\check{K}_t = f(K_t^1, K_t^2, \alpha_t) = \alpha_t K_t^1 + (1 - \alpha_t)K_t^2.$$

After that, to keep the length of the generation action length, the processor 212 extends its length twice with linear interpolation sampling according to:

$$\hat{K}_t = \check{K}_{x_0} + \frac{(\check{K}_{x_1} - \check{K}_{x_0})}{(x_1 - x_0)}(x - x_0),$$

where x is $$\frac{L-1}{2L-1}t,$$

$x_0$ is $$\left\lfloor \frac{L-1}{2L-1}t \right\rfloor,$$

$x_1$ is $$\left\lceil \frac{L-1}{2L-1}t \right\rceil,$$

$\lceil \cdot \rceil$ and $\lfloor \cdot \rfloor$ indicate the ceiling operator and the floor operator, respectively.

With reference again to FIG. 5, as discussed above, in the Author Mode, the user can press a Modify Instruction button to modify the selected step by speaking into the microphone 238 to record further natural language input that is converted to text and replaces the selected step. In addition to replacing the text instructions for the selected step, the processor 212 also regenerates the virtual avatar animation for the selected step. Additionally, the user can press the Change Scale button to change the visualization scale of the selected step, e.g., of the humanoid virtual avatar. In some embodiments, the user can choose whether to display the whole body (third-person view) or just the hands (first-person view) of the virtual avatar.

Finally, the method 400 continues with displaying, in an AR or VR graphical user interface, the step-by-step visualizations (block 450). Particularly, after the step-by-step animations of the virtual avatar performing the task are generated, they can be viewed in the AR graphical user interfaces provided on the display screen 232 of the head-mounted AR device 230. With reference again to FIG. 5, the user can enter View Mode by clicking the Play button in the editing menu 520. This mode visualizes the currently selected instruction by rendering the generated context-aware virtual avatar animations in the head-mounted AR device 230.

The step-by-step animations of the virtual avatar are advantageously superimposed upon the environment in accordance with the contextual information, in a spatial-context-aware and temporal-context-aware manner. Particularly, steps in which the virtual avatar moves from one location in the environment to another are correctly animated to follow an accurate trajectory of motion. Likewise, steps in which the virtual avatar interacts with a virtual object are correctly animated to interact with the virtual object in a visually accurate manner. Finally, the respective virtual avatar animations for each step are sequenced together in a temporally smooth manner that does not include distracting discontinuities in the transitions between each step.

Exemplary Application Scenarios

With the AR instruction authoring system 200, users are enabled to author context-aware humanoid virtual avatar animation for AR instructions that can be adaptively deployed into various application scenarios. To provide a better understanding of the AR instruction authoring system 200, three exemplary application scenarios are discussed in which the AR instruction authoring system 200 demonstrates its ability to enable code-less and motion-capture-free authoring, create content that is to be deployed in different time primitives or via different platforms, and adapt to various contexts.

Figure 10:
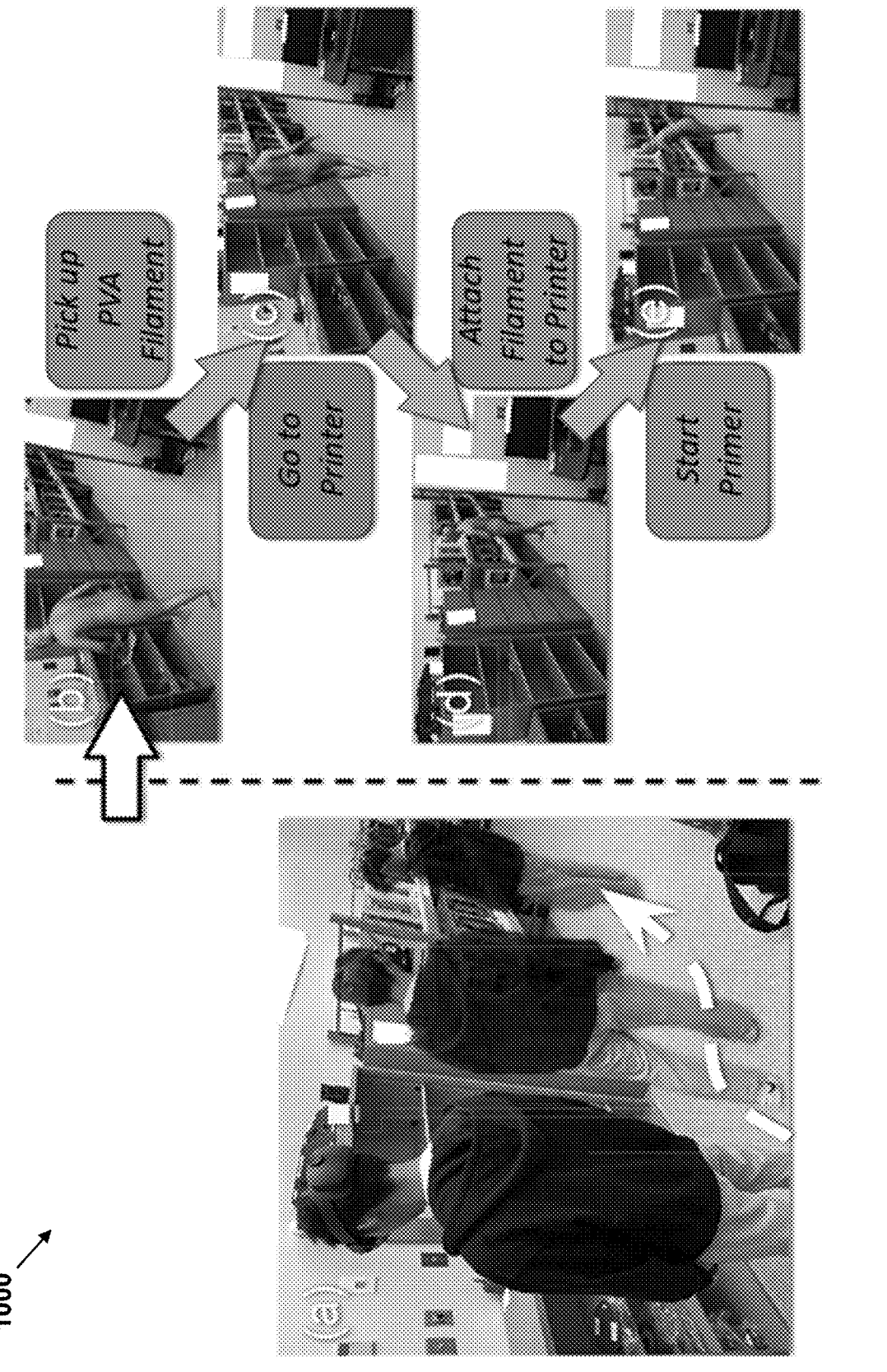
FIG. 10 shows a first exemplary application scenario in which the AR instruction authoring system is leveraged to generate asynchronous AR instructions.

FIG. 10 shows a first exemplary application scenario 1000 in which the AR instruction authoring system 200 is leveraged to generate asynchronous AR instructions. Asynchronous instructions are the most common case in the applications of AR instructions, where the authors create the content prior to the consumption of the AR experiences. The AR instruction authoring system 200 naturally supports asynchronous instructions. Here, a scenario is showcased in a research lab, where a senior researcher (Tom, the author) would like to leave an AR memo for his junior colleague (Jerry, the consumer) to instruct him on how to operate a 3D printer. In illustration (a), the senior lab researcher leaves an AR memo for his colleague on how to use a 3D printer. He simply walks around the printing lab using the AR instruction authoring system 200 to contextualize the textual instructions, capturing the location of the PVA filament and the printer. Tom creates and modifies the text instructions with the help of the AR instruction authoring system 200, then provides context to the system by walking up to the locations and taking snapshots of the environment. He informs Jerry to get the printing materials and then go to a specific 3D printer to print a product. In illustrations (b)-(e), the corresponding humanoid animation is generated according to the step-by-step instructions. Later, when Jerry arrives in the laboratory, he can see and follow the step-by-step AR memo from Tom to start working on the product. As can be seen, the AR instruction authoring system 200 is capable of handling AR instructions of diverse content and context, namely spatial or temporal context, and local or global content.

Figure 11:
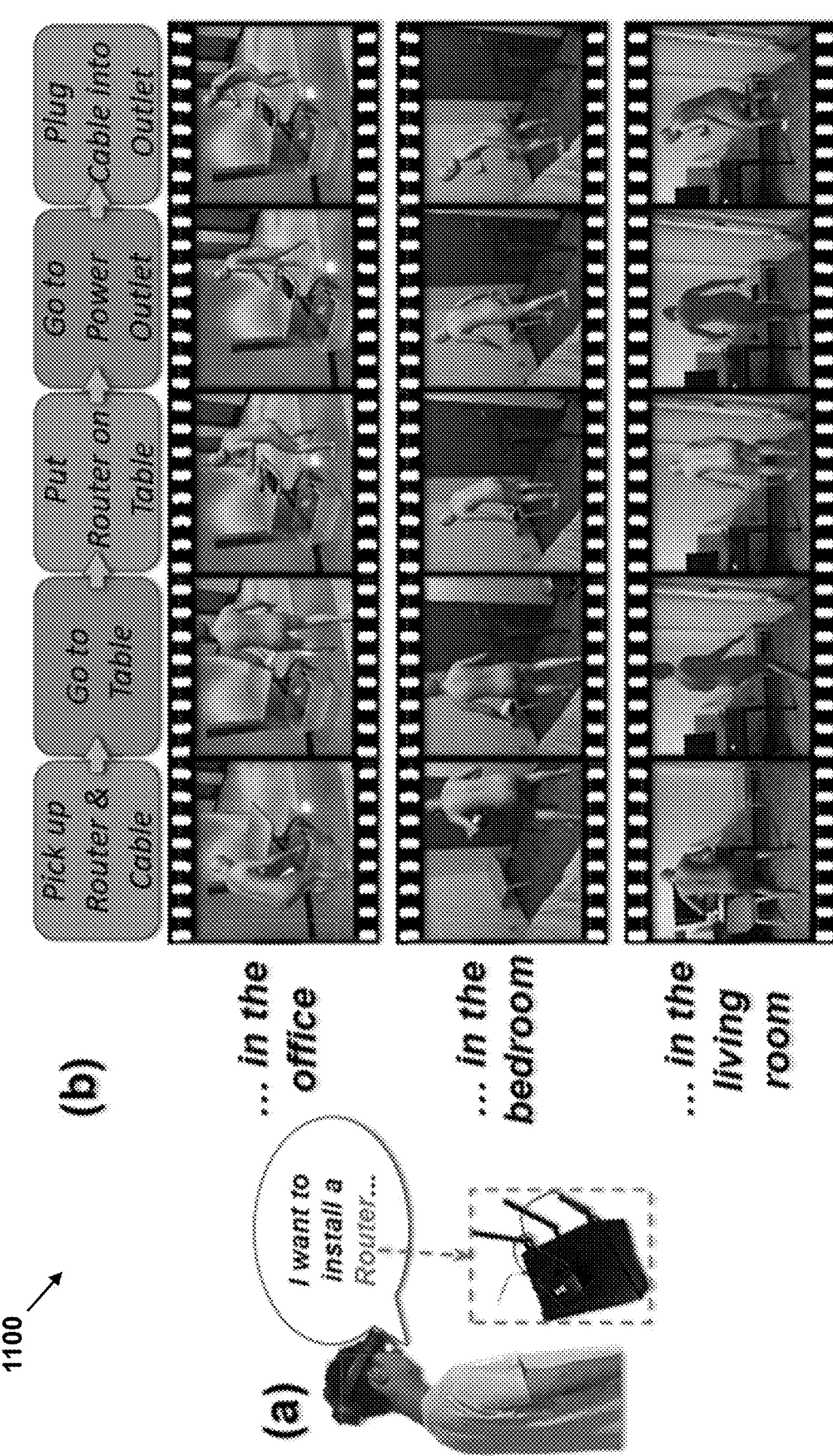
FIG. 11 shows a second exemplary application scenario in which the AR instruction authoring system is leveraged to generate Ad Hoc AR instructions.

FIG. 11 shows a second exemplary application scenario 1100 in which the AR instruction authoring system 200 is leveraged to generate Ad Hoc AR instructions. In this scenario, it is showcased how the workflow of the AR instruction authoring system 200 is capable of authoring ad hoc instructions in response to changing contexts. As shown in illustration (a), as a technician from the lab, Tom would like to teach his colleague how to install a router. The instructions are fairly simple and easy to understand. However, the detail of the steps varies across environments, e.g. in the office, the bedroom, or the living room, because the locations of the router and the outlet vary. With the same protocol to be visualized, Tom simply has to contextualize the protocol in different places, assigning the locations of the objects by traversing the rooms. Particularly, Tom scans the environment to provide contextual information to the system. As shown in illustration (b), the AR instruction authoring system 200 will generate humanoid avatar animations that blend into different physical realities (e.g. an office, a bedroom, or a living room). As a result, Tom authors different avatar animations for diverse contexts with the same instruction protocol.

Figure 12:
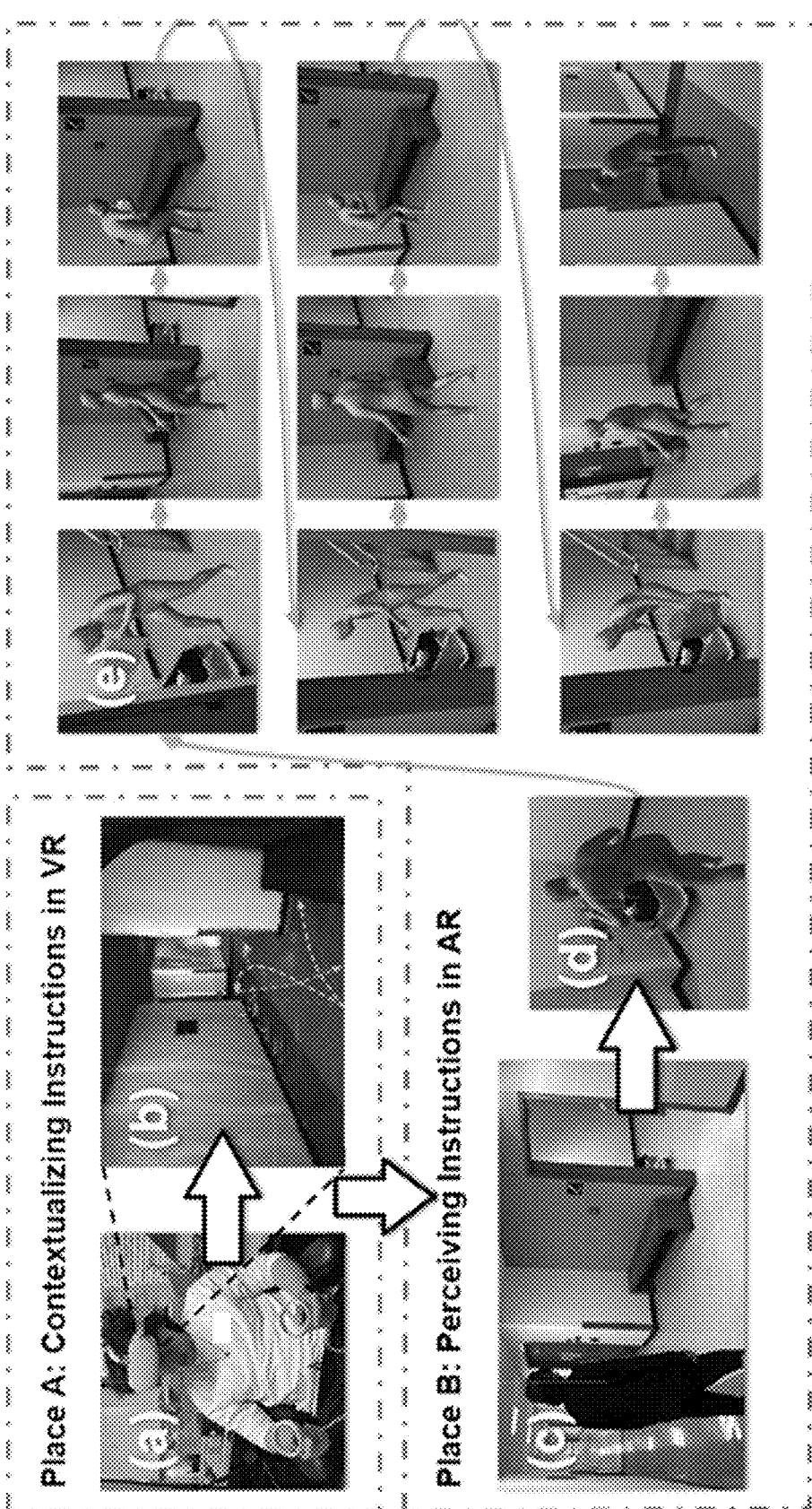
FIG. 12 shows a third exemplary application scenario in which the AR instruction authoring system is leveraged to provide remote AR instructions.

FIG. 12 shows a third exemplary application scenario 1200 in which the AR instruction authoring system 200 is leveraged to provide remote AR instructions. In this scenario, the AR instruction authoring system 200 is deployed in a remote instruction task. In this scenario, Butch, the deliveryman of the building, arrives in the lab with new devices to be allocated. Noticing no one is in the lab, Butch contacts Jerry, asking about the allocation of the devices. Jerry, who is not present at the lab, confirms the devices and their checkout points (i.e. where they are to be placed). As shown in illustration (a), Jerry then enters a pre-scanned point-cloud map of the lab in Virtual Reality (VR), where he authors the instructions in VR using the AR instruction authoring system 200 by navigating the map and taking screenshots. As shown in illustration (b), a mock-up VR scenario was built to record Jerry's locations in VR and correspond them to the physical reality. The AR instruction authoring system 200 generates humanoid avatar instructions according to the contextual information provided. Once the instructions are contextualized, the delivery man can view the humanoid instructions on delivering the packages, as shown in illustrations (c) and (d). Particularly, the authored AR instructions are then sent to Butch, who follows the avatar demonstrations to allocate the devices to different locations, as shown in illustrations (d) and (e). As can be seen, the AR instruction authoring system 200 is capable of authoring synchronous remote instructions. This application scenario also showcases the possibilities to author AR experiences in VR with the AR instruction authoring system 200 with aligned contextual information between the physical reality and the VR environment.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general-purpose or special-purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data that cause a general-purpose computer, special-purpose computer, or special-purpose processing device to perform a certain function or group of functions. Computer-executable instructions also include program modules that are executed by computers in stand-alone or network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered illustrative and not restrictive in character. It is understood that only the preferred embodiments have been presented and that all changes, modifications, and further applications that come within the spirit of the disclosure are desired to be protected.

What is claimed is:

1. A method for generating augmented reality or virtual reality instructional content, the method comprising:
   receiving, via at least one input device, a natural language user input from a user describing a task;
   generating, with a processor, natural language step-by-step text instructions for performing the task using a first machine learning model, based on the natural language user input, the natural language step-by-step text instructions including an ordered sequence of steps for performing the task, each step including text instructions;

capturing, with at least one sensor, contextual information at least including spatial information relating to an environment in which the task is to be performed, the capturing the contextual information including (i) identifying a first subset of steps from the ordered sequence of steps, and (ii) capturing first contextual information relating to a first area of the environment in which the identified first subset of steps are to be performed, the first contextual information being associated with the first subset of steps; and generating, with the processor, step-by-step animations of a virtual avatar performing the task using a second machine learning model, based on both the natural language step-by-step text instructions and the contextual information, wherein the natural language step-by-step text instructions and the step-by-step animations of the virtual avatar are used by an augmented reality device or a virtual reality device to display augmented reality or virtual reality instructional content.

2. The method according to claim 1, wherein the at least one input device includes a microphone, the receiving further comprising:

recording, with the microphone, the natural language user input spoken by the user.

3. The method according to claim 1, wherein the first machine learning model is a language model configured to receive natural language prompts and generate natural language responses.

4. The method according to claim 3, the generating the natural language step-by-step text instructions further comprising:

generating a first natural language prompt based on the natural language user input; and generating, with the first machine learning model, a first natural language response by inputting the first natural language prompt into the first machine learning model, the first natural language response including the natural language step-by-step text instructions.

5. The method according to claim 4, the generating the first natural language prompt further comprising:

forming the first natural language prompt by combining the natural language user input with predefined prompt text configured to prompt the first machine learning model to output the natural language step-by-step text instructions for performing the task that is described in the natural language user input.

6. The method according to claim 5, wherein the predefined prompt text includes a list of action labels and the predefined prompt text is configured to prompt the first machine learning model to provide the step-by-step text instructions incorporating action labels from the list of action labels.

7. The method according to claim 1 further comprising:

modifying the natural language step-by-step text instructions based on a user input received via the at least one input device.

8. The method according to claim 1, wherein the at least one sensor includes a camera, the capturing the contextual information further comprising:

capturing images of the environment with the camera; and determining the spatial information relating to the environment based on the images.

9. The method according to claim 1, the capturing the contextual information further comprising:

detecting an object in the environment; and determining a spatial position of the object within the environment, the contextual information including the spatial position of the object.

10. The method according to claim 9, the capturing the contextual information further comprising:

determining a semantic label for the object, the contextual information including the semantic label for the object.

11. The method according to claim 9, the capturing the contextual information further comprising:

determining a pose of the object, the contextual information including the pose of the object.

12. The method according to claim 1, the capturing the first contextual information further comprising:

capturing a motion trajectory of the user as the user navigates the environment to reach the first area of the environment in which the identified first subset of steps are to be performed, the motion trajectory being associated with the first subset of steps.

13. The method according to claim 1, the generating the step-by-step animations further comprising:

generating, for each respective step in the ordered sequence of steps, a respective animation of the virtual avatar performing the respective step.

14. The method according to claim 13, the generating the respective animation of the virtual avatar performing the respective step further comprising:

generating the respective animation of the virtual avatar performing the respective step using the second machine learning model based on the text instructions of the respective step and the contextual information, wherein the respective animation is associated with a particular spatial location within the environment.

15. The method according to claim 14, wherein the respective animation includes an interaction with a virtual object by the virtual avatar and the respective animation is associated with a physical object in the environment that corresponds to the virtual object.

16. The method according to claim 13, the generating the step-by-step animations further comprising:

forming a continuous animation by combining the respective animations of the virtual avatar performing each respective step for performing the task; and smoothing transitions between the respective animations of the virtual avatar performing each respective step for performing the task using a temporal smoothing algorithm.

17. The method according to claim 1, wherein the second machine learning model is a text-to-motion diffusion model.

18. The method according to claim 17, wherein the text-to-motion diffusion model adds an input token to each frame of a motion embedding, the input token being an embedding of text conditions, the text conditions including at least a portion of the natural language step-by-step text instructions.

19. The method according to claim 1 further comprising:

displaying, in an augmented reality or virtual reality graphical user interface, the step-by-step animations of the virtual avatar, the step-by-step animations of the virtual avatar being superimposed upon the environment in accordance with the contextual information.

*    *    *    *    *